United States Patent
Olsen et al.

(10) Patent No.: US 9,232,026 B2
(45) Date of Patent: Jan. 5, 2016

(54) SYSTEM FOR COMMUNICATING CONTROL MESSAGES IN AN AVB NETWORK

(75) Inventors: David Olsen, Kaysville, UT (US); Levi Pearson, Lehi, UT (US); Craig Gunther, Salt Lake City, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 830 days.

(21) Appl. No.: 13/333,387

(22) Filed: Dec. 21, 2011

(65) Prior Publication Data

US 2013/0166674 A1 Jun. 27, 2013

(51) Int. Cl.
*G06F 15/16* (2006.01)
*H04L 29/06* (2006.01)
*H04L 29/08* (2006.01)

(52) U.S. Cl.
CPC .............. *H04L 69/08* (2013.01); *H04L 69/03* (2013.01); *H04L 69/32* (2013.01)

(58) Field of Classification Search
CPC ... H04L 29/06; H04L 29/08072; H04L 67/10; H04L 65/403; H04L 47/70; H04L 67/02
USPC ....................................................... 709/217
See application file for complete search history.

(56) References Cited

U.S. PATENT DOCUMENTS

| | | | |
|---|---|---|---|
| 2005/0220148 A1* | 10/2005 | DelRegno et al. | 370/498 |
| 2007/0036079 A1* | 2/2007 | Chowdury et al. | 370/235 |
| 2008/0086568 A1 | 4/2008 | Badt et al. | |
| 2008/0130681 A1* | 6/2008 | Hong et al. | 370/468 |
| 2008/0232243 A1* | 9/2008 | Oren et al. | 370/216 |
| 2008/0310449 A1* | 12/2008 | Cha et al. | 370/474 |
| 2009/0034518 A1* | 2/2009 | Diab | 370/389 |
| 2010/0002592 A1* | 1/2010 | Effenberger et al. | 370/241.1 |
| 2012/0076036 A1* | 3/2012 | Teener | 370/252 |

OTHER PUBLICATIONS

Dr. Thomas Strang et al, "Vehicle Networks—Multimedia Protocols" Deutsches Zentrum für Luft-und Raumfahrt, WS 2008/2009, 33 pages.
LAN/MAN Standards Committee of the IEEE Computer Society, "Virtual Bridged Local Area Networks—Amendment XX: Stream Reservation Protocol (SRP)", IEEE P802.1 Qat/D6.0, Apr. 23, 2010, pp. i-100.
LAN/MAN Standards Committee, IEEE Computer Society, "Timing and Synchronization for Time-Sensitive Applications in Bridged Local Area Networks", IEEE Std 802.1AS, Mar. 30, 2011, pp. i-274.

(Continued)

*Primary Examiner* — Jude Jean Gilles
*Assistant Examiner* — Jaren M Means
(74) *Attorney, Agent, or Firm* — Alleman Hall McCoy Russell & Tuttle LLP

(57) ABSTRACT

A system that includes a transmitting apparatus and a receiving apparatus may communicate over an Ethernet Audio/Video Bridging network. The transmitting apparatus and the receiving apparatus may each include an application layer module in communication with an application interface module. The application layer module of the transmitting apparatus may interface with the application interface module to send a control message over the network to control flow of a data stream over the network. The application layer module of the receiving apparatus may interface with the application to interface module to receive the control message.

31 Claims, 9 Drawing Sheets

(56) References Cited

OTHER PUBLICATIONS

LAN/MAN Standards Committee, IEEE Computer Society, "Virtual Bridged Local Area Networks", Stream Reservation Protocol (SRP), Amendment 14, IEEE Std. 802.1Qat, Sep. 30, 2010, pp. i-103.

LAN/MAN Standards Committee, IEEE Computer Society, "Virtual Bridged Local Area Networks—Amendment 12: Forwarding and Queuing Enhancements for Time-Sensitive Streams", IEEE Std 802.1Qav, Jan. 5, 2010, pp. i-71.

Mircroprocessor Standards Committee of the IEEE Computer Society, "Draft Standard for Layer 2 Transport Protocol for Time Sensitive Applications in a Bridged Local Area Network", Sep. 2010, pp. i-54.

Craig Gunther, "802.1 Qat Current Status", IEEE 802.1 Working Group, Nov. 11, 2008, www.ieee802.org/1/files/public/docs2008/at-cgunther-qat-status-1108-v01.pdf, pp. 1-20.

Virtual Bridged Local Area Networks—Amendment XX: Stream Reservation Protocol (SRP), Draft Standard for Local and Metropolitan Area Networks—IEEE P802.1 Qat/D6.1, Jun. 4, 2010, pp. i-100 (108 pages).

International Search Report and Written Opinion for PCT Application No. PCT/US2012/043284 dated Sep. 5, 2012.

* cited by examiner

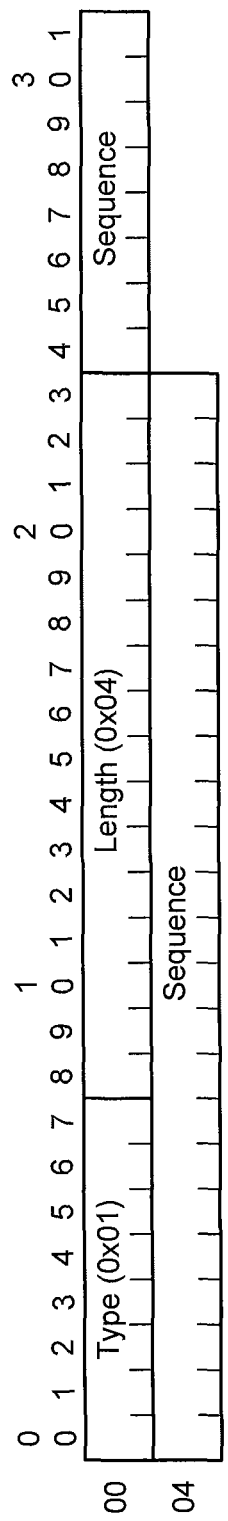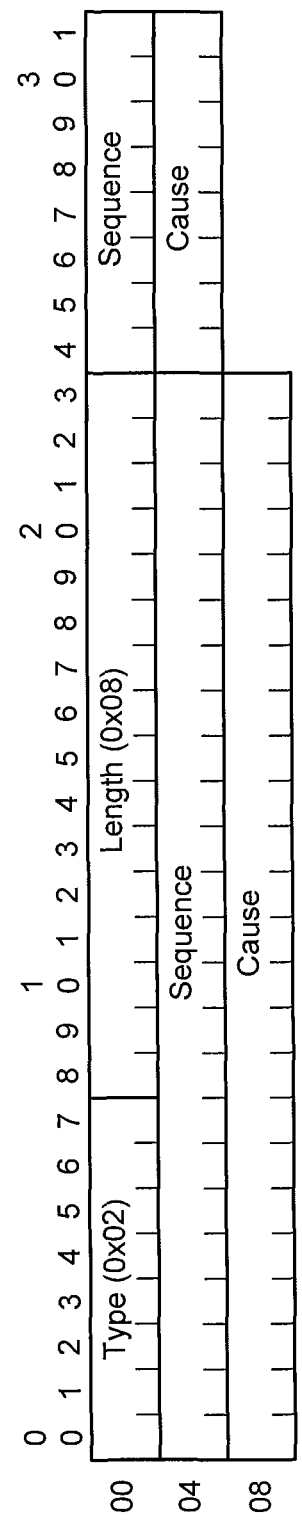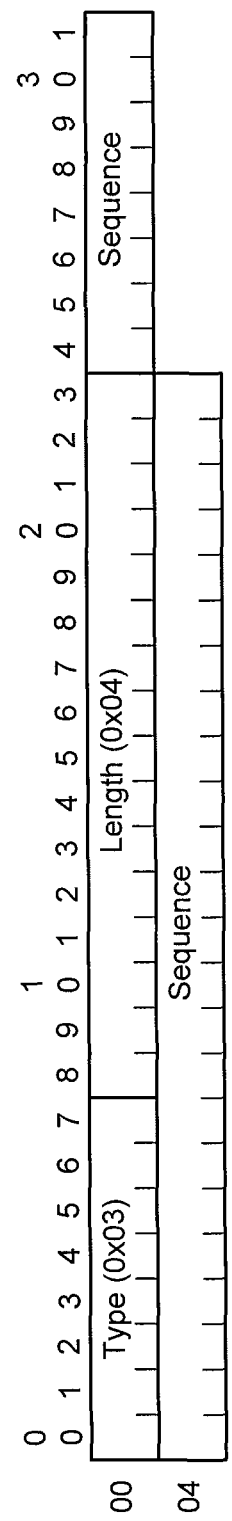
Fig. 5
Fig. 6
Fig. 7

SYSTEM FOR COMMUNICATING CONTROL MESSAGES IN AN AVB NETWORK

BACKGROUND OF THE INVENTION

1. Technical Field

This invention relates to an Ethernet Audio-Video Bridging ("AVB") network, and more particularly to managing data streams on the AVB network through control messages sent through high-level application layer interfaces.

2. Related Art

Audio/video ("A/V") data may be transmitted in a network system from one endpoint to another endpoint. Before the A/V data is sent, control signals may be sent over the network in order to establish a path over which the A/V data may travel from the one endpoint to the other. Similarly, control signals may be used to remove the path between the endpoints.

SUMMARY

A system that includes a transmitting apparatus and a receiving apparatus may communicate over an Ethernet Audio/Video Bridging (AVB) network. The transmitting apparatus and receiving apparatus may be configured to communicate application layer messages, including control message, acknowledgement messages, negative acknowledgement messages, and synchronization messages to manage and/or control flow of a data stream over the network. The transmitting apparatus and the receiving apparatus may each include an application layer module in communication with an application interface module to generate, send, and/or receive the application layer messages.

The application layer module of the transmitting apparatus may wish to send a control message over the network to the receiving apparatus. The application layer module may request from the application interface module a data structure and may insert information included in the control message into the data structure. The application layer module may then pass the data structure with the inserted information back to the application layer interface. The application layer interface may communicate and/or operate with a lower-layer module to convert the data structure with the inserted information into a control message having a packet format that is suitable for being sent over the network. The packet format may be a type-length-value (TLV) format, which includes a type field, a length field, and a value field. The value field may include a sequence number that uniquely identifies the control message. The value field may also include one or more data parameters that the application layer module of the receiving apparatus may use to process the control message and/or control the flow of the data stream, such as perform one or more operations of a function of the application layer module. The control message having the packet format, such as the TLV packet format, may be included in a data packet, such as a User Datagram Protocol (UDP) datagram. The lower-layer module may construct the datagram and transmit the control message as a datagram over the network. The application interface module may be configured to communicate and/or operate with the lower-layer module to establish a timeout period that the application interface module is to wait before resending the control message. If the timeout period expires, the application interface module may be configured to communicate and/or operate with the lower-layer module to resend the control message.

The application interface module of the receiving apparatus may receive notification of the control message being received from a lower-layer module of the receiving apparatus. Upon receipt of the notification, the application interface module may instruct the lower-layer module to send an acknowledgement message or a negative acknowledgement message indicating that the control message was received and whether the application layer module may process the control message. In addition, the application interface may provide the control message to the application layer module and receive notification from the application layer of whether the application layer module is finished processing the control message.

The transmitting apparatus may be configured to receive the acknowledgement message or the negative acknowledgement message from over the network. The application interface may notify the application layer module of the receipt of the acknowledgement or the negative acknowledgement message. Through establishing a timeout period and sending and receiving acknowledgement and negative acknowledgement messages, reliable communication of the control messages may be ensured.

Other systems, method, features and advantages will be, or will become, apparent to one with skill in the art upon examination of the following figures and detailed description. It is intended that all such additional systems, method, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 5 is a diagram of a format of an acknowledgement message.

FIG. 6 is a diagram of a format of a negative acknowledgement message.

FIG. 7 is a diagram of a format of a synchronization message.

DETAILED DESCRIPTION OF THE PREFERRED EMBODIMENTS

Demand for connectivity between network devices continues to increase at a fast rate. In many systems, a greater number of devices are being manufactured which have network connection and/or communication capabilities. For example, in some automobiles, components not previously considered connective are being manufactured with connective capabilities. Parts, such as brakes, throttle, and/or various other parts, may be manufactured as Ethernet Audio-Video Bridging ("Ethernet AVB") enabled devices which may communicate through an Ethernet AVB network. In some systems, Ethernet AVB networks may be used to connect one or more devices, with audio and/or video data streams being sent wireless and/or through a wireline, such as an Ethernet cable.

In other systems, the devices may be connected and/or communicate with each other over a network using mediums other than Ethernet cables, such as a fiber optic cables. An example network that uses a medium other than an Ethernet cable is a Media Oriented Systems Transport (MOST) network. Devices connected in a MOST network may communicate with each other using the MOST vehicle bus standard, which uses time division multiplexing as an underlying transport mechanism to communicate A/V data between devices. In a system that communicates using the MOST vehicle standard, control of the A/V data sent over the network may be performed using control messages. A device in the MOST network may generate a control message at a high-level layer, such an application layer, of the device. The application layer or a module of the application layer may be referred to as a Function Block (FBlock). The control message may be a Function Block ("FBlock") control message. FBlock control messages may be generated, processed, sent and/or received by the devices in the MOST network at the application layer. The application layer, or one or more modules of the application layer, may communicate with an interface for sending and receiving the FBlock control messages. The interface may be referred to as an FBlock interface. The FBlock interface may communicate with other applications and/or modules in the same or a different layer within the device to send, receive, generate, and/or process the FBlock control signals.

The MOST network using fiber optic cables may be replaced with the Ethernet AVB network using Ethernet cables, where the underlying transport mechanism includes prioritized packet switching rather than time division multiplexing. Where the MOST network is replaced with the Ethernet AVB network, it may be desirable to still control and/or manage the flow of A/V data using one or more FBlock application layer modules and/or FBlock control messages.

Figure 1:
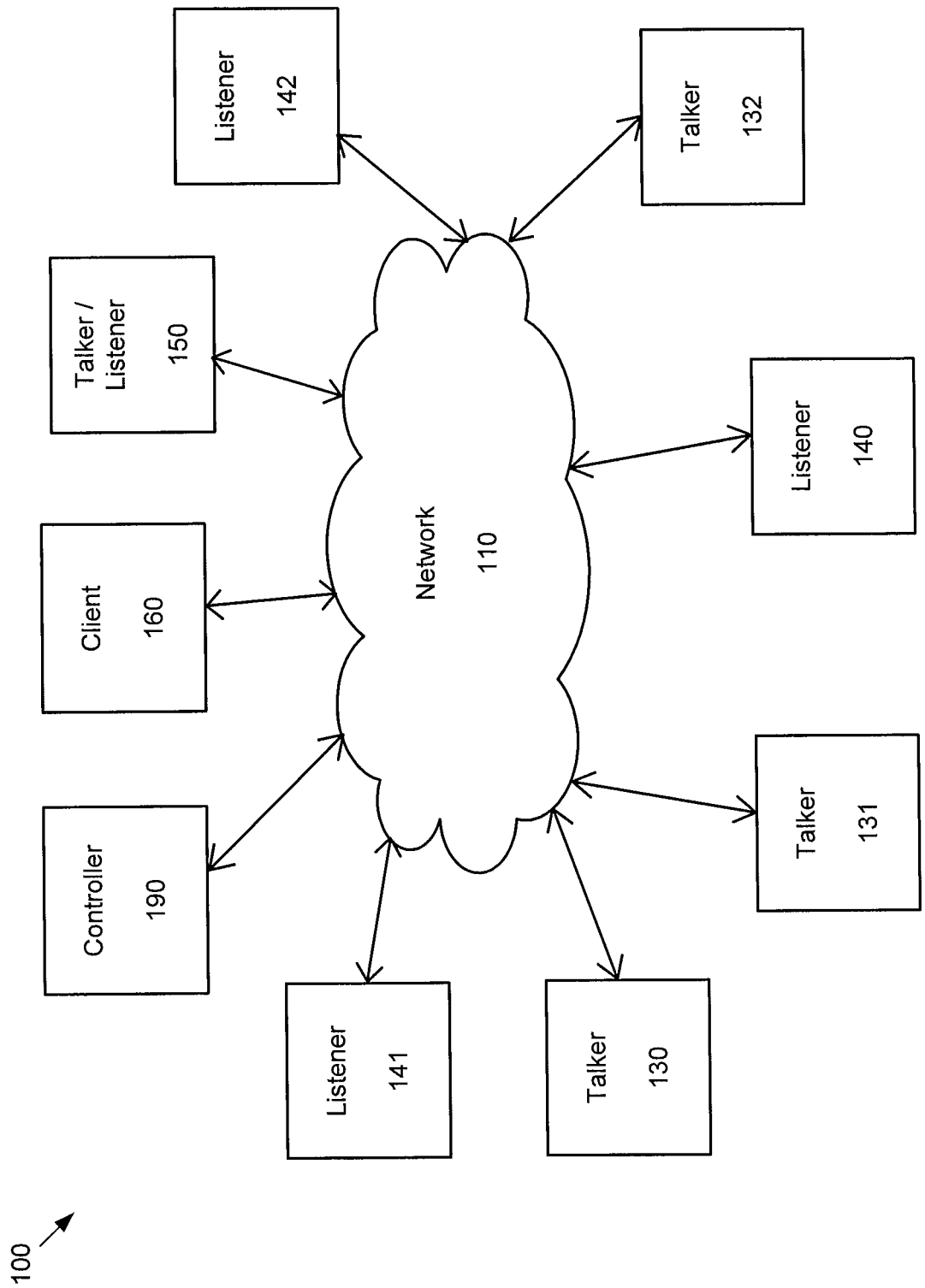
FIG. 1 is a block diagram of an example network communication system.

FIG. 1 illustrates an example network communication system 100 which may incorporate, include, and/or use high-level application layer control signals, such as FBlock control signals, to control the flow of A/V signals. The system 100 may include a plurality of electronic devices, including electronic devices 130, 131, 132, 140, 141, 142, 150, 160, and 190. More or fewer electronic devices may be included. Each electronic device 130, 131, 132, 140, 141, 142, 150, 160, and/or 190 may be configured to perform one or more roles. The roles may include the role of a talker, the role of a listener, the role of a talker/listener, the role of a client, and/or the role of a controller. Other roles may be included. The role of the talker may be to transmit information and/or data across the network 110. Alternatively or in addition, the role of the talker may be to establish, create, and/or reserve a connection for the transmission of a data stream carrying the information and/or data. Alternatively or in addition, the role of the talker may be to remove or tear down the connection. The role of the listener may be to receive the information and/or the data that has been sent over the network 110. Alternatively or in addition, the role of the listener may be to connect to and/or reserve connection to the data stream. Alternatively or in addition, the role of the listener may be to remove connection from the data stream. The role of the talker/listener may be to perform both the role of the talker and the listener, either at the same time or at different times.

The role of the controller may be to control the flow of the data stream between the talker and the listener or the talker/listener. The controller may control the flow of the data stream by sending one or more messages to the talker, the listener, and/or the talker/listener to create a connection and/or remove the connection of the data stream between the talker and the listener or the talker/listener. The messages may be communicated to the talker, the listener, and/or the talker/listener through a high-level application layer of the talker, the listener, and/or the talker/listener. Alternatively or in addition, the role of the controller may be to identify and/or determine which of the talkers are of importance, relevant to, and/or expected to be used by a listener. The role of the client may be to determine an input, such as a user input, indicative of the creation or the removal of the connection of the data stream and communicate the input to the controller.

The electronic devices 130, 131, 132, 140, 141, 142, 150, 160, and/or 190 may be configured to perform different roles in different situations or at different times. For example, in one situation, one of the electronic devices may be configured to be a talker. In a different situation, that electronic device may be configured to be a listener. Alternatively, the roles that the electronic devices 130, 131, 132, 140, 141, 142, 150, 160, and/or 190 may be configured to perform may be fixed. For the following description, the electronic devices 130, 131, 132, 140, 141, 142, 150, 160, and 190 in the system 100 have been designated the roles as previously described. In an alternative system, other roles may be designated. The system 100 may include one or more talkers 130, 131, and 132, one or more listeners 140, 141, and 142, one or more talker/listeners 150, one or more clients 160, and/or one or more controllers 190. Each component of the system 100, including the talkers 130, 131, 132, the listeners 140, 141, 142, the talker/listeners 150, the clients 160, and the controllers 190, may be in communication with one or more of the other components over the network 110.

One or more of the talkers 130, 131, and 132, the listeners 140, 141, and 142, the talker/listeners 150, the clients 160, and/or the controllers 190 may be or may include hardware, software, and/or a combination of hardware and software to implement part or all of the functionality of the system 100. One or more of the talkers 130, 131, and 132, the listeners 140, 141, and 142, the talker/listeners 150, the clients 160, and/or the controllers 190 may be or may include one or more processors, such as one or more central processing unit (CPU), and/or may be in communication with one or more processors, such as a processor of a field programmable gate array (FPGA). More or fewer components may be included in other examples.

One or more of the talkers 130, 131, and 132, the listeners 140, 141, and 142, the talkers/listeners 150, and/or the controllers 190 may be connected to each other through or using the network 110. Alternatively or additionally, one or more of the talkers 130, 131, and 132, the listeners 140, 141, and 142, the talkers/listeners 150, and/or the controllers 190 may be connected to each other directly. For example, one or more of the talkers 130, 131, and 132, the listeners 140, 141, and 142, the talkers/listeners 150, and/or the controllers 190 may be connected to each other using a wireline such as an Ethernet cable, and/or a wireless network. Various other connections are possible.

The network 110 may be, include, and/or communicate through or with an to Ethernet AVB network. The network 110 may include one or more bridges which may communicate with one or more devices communicating through and/or connected with the network. The one or more bridges may communicate with the network 110 and/or devices connected to the network through or using various protocols, such as Ethernet AVB protocols designated by the IEEE. For example, one or more bridges may communicate with the network 110 and/or devices connected to the network through or using Ethernet AVB protocols such as IEEE 802.1AS-2011 (gPTP) for network timing and synchronization, IEEE 802.1Qav-2009 for queuing and forwarding streaming data, IEEE 802.1Qat-2010 ((Stream Reservation Protocol (SRP)) for reserving data stream bandwidth in a network, and/or IEEE 1722-2011 related to a possible data streaming format. Various other protocols may be used. Alternatively or additionally, the network 110 may be, include, and/or communicate through or with wide area networks (WAN), such as the Internet, local area networks (LAN), campus area networks, metropolitan area networks, or any other wireless and/or wireline networks that may allow for data communication. The network 110 may be divided into sub-networks. The sub-networks may allow access to all of the components connected to the network 110, or the sub-networks may restrict access between the components connected to the network 110. The network 110 may be regarded as a public or private network and may include, for example, a virtual private network, an encryption, or any other security mechanism employed over the public Internet, or the like. Various other types of networks 110 are possible.

One or more of the talkers 130, 131, and 132, the listeners 140, 141, and 142, and/or the talker/listener 150 may be connected to the network 110 in any configuration that supports data transfer. This may include a data connection to the network 110 that may be wired or wireless. One or more of the talkers 130, 131, and 132, the listeners 140, 141, and 142, and/or the talker/listeners 150 may be connected to an Ethernet AVB network and/or to each other through or with an Ethernet connection, such as using a cable or wireless connection to an Ethernet AVB network. Various other connections may be possible.

The system may include one or more talker systems, or talkers 130, 131, and 132. In small communication networks, the system may have only a small number of talkers, such as twenty or less. In other larger communication systems, the system may include hundreds, thousands, or potentially millions of talkers. Various numbers of talkers are possible.

The talkers 130, 131, and 132 may or may not be or include a portion or all of the features of a computer system, such as a computer system 1000 shown in FIG. 10 and described later. The talkers 130, 131, and 132 may be Ethernet AVB enabled and/or compatible. The talkers 130, 131, and 132 may be configured, adapted, operable, and/or enabled to communicate through and/or with an Ethernet AVB network using one or more standards or protocols. An example of a protocol associated with communications between a talker 130 and a network 110 may be the stream reservation protocol specified in IEEE 802.1Qat-2010. Alternatively or additionally, various other protocols, such as Multiple MAC Registration Protocol ("MMRP"), IEEE 802.1AS-2011 (gPTP), IEEE 802.1Qav-2009, and/or IEEE 1722-2011 may be used.

The talkers 130, 131, and 132 may be configured, adapted, operable, and/or enabled to send information and/or data through the network 110. For example, talkers 130, 131, and 132 may be configured and/or adapted to send a stream of information that includes data, commands, and/or command signals through, using, or across an Ethernet AVB network. Information and/or data sent by talkers 130, 131, and 132 through the network 110, such as through an Ethernet AVB network, may be received by other devices connected with the network 110, such as listeners 140, 141, and 142 and/or talker/listeners 150.

The talkers 130, 131, and 132 may perform various functions and/or be connected with or include various components. For example, a talker 130 may be connected with the network 110 and an input device, such as a musical instrument or microphone. Information and/or data may be sent to, received by, and/or otherwise input to the talker 130 or a device connected with the talker 130. For example, a user may play an instrument or sing into a microphone connected with the talker 130, and information and/or data about the instrument, singing, and/or voice may be received by the talker 130.

While the talkers 130, 131, and 132 in the network communication system may be, and may be described as, the physical devices themselves (such as a microphone), it should be appreciated that in some systems, the talker may be or may include a computer or other electronic controlling device, which may be used and/or operate to control the talker (such as a microphone), such as some or all of the features of a computer system 1000 shown in FIG. 10 and described later. In these systems, the computer or other electronic controller device may be AVB enabled and/or communicate directly with the network 110. In addition, the computer or other electronic controller device may communicate in various ways with the physical device and/or another device, such as with a wired or wireless connection. Various other alternatives are possible.

The talker 130 may process the information and/or data received in various ways. For example, the talker 130 may transform any signal received, such as the musical signal, from an analog signal to a digital signal. In other systems, a computing device may perform processing of received information and/or data, and may send the processed information and/or data to the talker 130. Various other processing functions may be performed by the talker 130 and/or devices in communication with the talker 130.

The talker 130 may transmit, send, output, and/or advertise processed information and/or data to the network 110, such as in, with, and/or using a data stream and/or Ethernet AVB signal. For example, the talker 130 may advertise a data stream encompassing data related to music played by a user on a device connected with the talker 130 onto an Ethernet AVB network. The information and/or data advertised by the talker 130 on the network 110 may be received by other devices, such as by various listeners 140, 141, and 142 and/or talker/listeners 150. Various other functions may be performed by the talker 130.

Each talker 130, 131, and 132 may have one or more talker attributes. Talker attributes may specify, include and/or otherwise identify characteristics about the talker 130 and/or a data stream advertised by a talker 130. For example, a talker attribute may indicate and/or advertise that the talker 130 may have a data stream, such as an audio, video, and/or command data stream, that the talker 130 will multicast over the network 110. A talker attribute may specify how much bandwidth a data stream advertised by a talker 130 may require in order to be transmitted through the network 110. The amount of bandwidth specified may be used by bridges and/or switches in the network 110 to determine if there is enough bandwidth capability to reserve the amount of bandwidth at each switch in the path between the talker 130 and the listener 140. In one example, the listener 140 may not be concerned with the amount of bandwidth because one or more of the switches and/or bridges may indicate a failure due to bandwidth constraints before the listener receives bandwidth information specified in the attribute. Alternatively or in addition, a talker attribute may specify how long it may take information and/or data sent from the talker 130 to reach a listener 140, which may be referred to as a latency or latency period. Alternatively or in addition, a talker attribute may specify a destination address. In one example, the destination address may not be unique to a particular listener, such as the listener 140. The destination address may be a multicast destination that allows any listeners, such as listeners 140, 141, 142 to receive and/or process the data stream being advertised once the reservation is in place and transmission has begun. Alternatively, the destination address may be unique to a particular listener.

Alternatively or in addition, a talker attribute may specify a unique stream identifier ("ID") for the stream advertised by the talker 130. A talker attribute may specify, include, and/or identify various other pieces of information and/or data. One talker attribute may include multiple pieces of information and/or data, such as information about a bandwidth required for download and/or a unique stream ID of the talker. In some systems, each talker attribute may be related to only one piece of information and/or data, and each talker 130, 131, and 132 may have multiple talker attributes. In other systems, each talker 130, 131, and 132 has only one talker attribute which specifies multiple pieces of information and/or data about the talkers. Various combinations are possible.

Talker attributes may include a Talker Advertise (TA) and/or a Talker Failed (TF). As mentioned, a talker attribute may specify a stream ID for a stream that the talker 130 produces or wants to produce. The stream ID may be a unique sequence of characters and/or numbers which may only be assigned to one stream. In some systems, no two streams may have the same stream ID. An assignment and/or identification of a unique stream ID of a talker 130 may then be used by devices, such as the listener 140, to identify a stream for which the device wants to attach itself. For example, the listener 140 may receive over an Ethernet AVB network a message, such as an advertisement, that includes a unique stream ID and may, based on an identification of the unique stream ID, request attachment to the stream associated with the unique stream ID. Various other uses of the stream ID are possible. The unique stream ID may be a 64 bit stream ID, or various other stream IDs may be used. The talker 130 may be configured to assign a unique stream ID to a stream at a time that the talker 130 is manufactured, such as by a manufacturer, after manufacture, such as at a time that the talker 130 connects with the network 110, such as by a controller 190, and/or at various other times.

One or more talker attributes may be stored in one or more of talkers 130, 131, and 132, listeners 140, 141, and 142, talker/listener 150, and/or controllers 190. For example, a unique stream ID of a talker 130 may be sent to and/or received by a controller 190, which may record and/or store the unique stream ID of the talker 130 and/or forward the unique stream ID of the talker 130 to one or more listeners 140, 141, and 142, such as through, with, or using a non-SRP protocol. Various other uses and functions of talker attributes are possible.

A stream advertisement may be a signal and/or other transmission from a talker 130, 131, 132 which may be passed through the network 110. A stream advertisement sent by a talker 130 may indicate that the talker 130 has a data stream that it can, cannot, will, or will not send, multicast, and/or otherwise transmit over the network 110. The stream advertisement may include a Talker Advertisement ("TA") or a Talker Failed ("TF"). The TA may be an advertisement for a stream that has not encountered any bandwidth or other network constraints along the network path from the talker. The TF may be an advertisement for a Stream that is not available to the Listener because of bandwidth constraints or other limitations somewhere along the path from the talker. If a bridge or switch along a path from the talker to listener does not have sufficient bandwidth or resources available, the bridge or switch may change the TA message to a TF message before forwarding it toward the Listener.

The stream advertisement may include details about the data stream, such as one or more talker attributes that may be sent with and/or included in a stream advertisement advertised and/or output by the talker 130. For example, the stream advertisement may include a unique stream ID of the data stream being advertised by the talker 130 using the stream advertisement. The stream advertisement sent by the talker 130 may be transmitted across the network 110 to and/or received by one or more devices (e.g., one or more listeners 140, 141, 142), in communication with the network. In some systems, the stream advertisement is sent to all devices on the network 110.

One or more listeners 140, 141, 142 and/or talker/listeners 150 may receive the stream advertisements. If one of the listeners wishes to receive the data stream being advertised by the TA, the listener may send a response message, such as a Listener Ready ("LR") message to a bridge, the network 110, and/or one or more of the talkers 130, 131, 132. The signal may be a request to attach to the data stream via the stream ID included in the stream advertisement. When an Ethernet AVB bridge or switch in the AVB network 110 receives the LR signal from the listener, the bridge may match the LR with the TA and allow the data stream referenced by the stream advertisement to be sent to the requesting listener. One or more listeners 140, 141, 142 may request and/or attach to the same data stream via one stream ID. One of the listeners 140, 141, 142 may request and/or attach to more than one data stream via the stream IDs of each requested data stream. Other variations are possible.

One or more stream advertisements may be sent and/or accessed individually and/or alone with, through, and/or using the network 110. One or more stream advertisements may be sent to, accessed by, and/or received by one or more receiving devices on the network 110, such as listeners 140, 141, 142, talker/listeners 150, and/or controllers 190. Various other uses and functions of stream advertisements and/or talker attributes are possible.

In small networks, the system 100 may have only a small number of listeners, such as twenty or less. In other larger communication systems, the system 100 may have hundreds, thousands, or potentially millions of listeners. Various numbers of listeners are possible.

The listeners 140, 141, and 142 may or may not be or include a portion or all of the features of a computer system, such as a computer system 1000 shown in FIG. 10 and described later. The listeners 140, 141, and 142 may be Ethernet AVB enabled and/or compatible. The listeners 140, 141, and 142 may be configured, adapted, operable, and/or enabled to communicate through and/or with an Ethernet AVB network using one or more standards or protocols, such as the stream reservation protocol identified in IEEE 802.1AS-2011 (gPTP), IEEE 802.1Qav-2009, IEEE 802.1Qat-2010 (SRP), and/or IEEE 1722-2011. Alternatively, various other protocols, such as a MMRP, may be used.

Listeners 140, 141, and 142 may be configured, adapted, and/or operable to receive information that includes data across, through, and/or using the network 110. For example a listener 140 may be configured and/or adapted to receive a data stream passing across a network 110, such as an Ethernet AVB network. The information and/or data received by a listener 140, 141, and 142 may be, for example, the information and/or data sent by the talker 130, 131, and 132, information and/or data sent by a controller 190, and/or various other information and/or data sent through and/or using the network 110. In some systems, the listeners 140, 141, and 142 may register for and/or receive a data stream from one or more of the talkers 130, 131, and 132. Registration for and/or receipt of a data stream may or may be received by the listeners 140, 141, and 142 with a guaranteed bandwidth. Various other possibilities exist.

Listeners 140, 141, and 142 may perform various other functions and/or include or be connected with various other components. For example, a listener 140 may be connected with a network 110 and an output device, such as a speaker or television monitor. Information and/or data may be gathered and/or otherwise received by the listener 140 through the network 110. For example, information and/or data about notes played on a musical instrument may be transmitted through the network 110 by the talker 130, and may be received by the listener 140. The listener 140 may process the information and/or data received through the network 110. The listener 140 may output processed information and/or data to the speaker. For example, the listener 140 may output information and/or data related to the signal received through the Ethernet AVB network 110 to the speaker.

While the listeners 140, 141, and 142 in the network communication system may be, and may be described as, physical devices themselves (such as a speaker), it should be appreciated that in some systems, the listener may be or may include a computer or other electronic controlling device which may be used and/or operate to control the listener (such as a speaker), such as some or all of the features of a computer system 1000 shown in FIG. 10 and described later. In these systems, the computer or other electronic controller device may be AVB enabled and/or communicate directly with the network 110. In these systems, the computer or other electronic controller device may communicate with the physical device and/or a different device in various ways, such as with a standard wired or wireless connection. Various other alternatives are possible.

Each listener 140, 141, and 142 may have one or more listener attributes or listener properties. The listener attributes or properties may or may not contain a single piece of information, such as a stream ID that the listener may want to attach to. One or more listener attributes may be sent with, through, and/or using the network 110. One or more listener attributes or properties may be sent to, accessed by, and/or received by one or more receiving devices on the network 110, such as talkers 130, 131, and 132, talker/listeners 150, and/or controllers 190. One or more listener attributes or properties may be stored in one or more of talkers 130, 131, and 132, listeners 140, 141, and 142, talker/listeners 150, and/or controllers 190. One or more listener attributes or properties may be used to connect a listener with a data stream and/or talker. Various other uses and functions of listener attributes are possible.

The listener attributes or properties may specify, include, and/or otherwise identify characteristics about one or more of the listeners 140, 141, 142. Listener attributes may, for example, exist and/or be used outside of a stream reservation protocol stack within a talker or a listener, and/or may be used to inform devices on the network 110 about the attributes or properties of one or more of the listeners 140, 141, 142. For example, a listener attribute or property may specify what talkers one or more of the listeners 140, 141, 142 may be interested in. A listener attribute or property may include the stream ID. A listener attribute or property may identify one or more capabilities of one or more of the listeners 140 141, 142, such as bandwidth that one or more of the listeners 140, 141, 142 has available, a type of data stream that one or more of the listeners 140, 141, 142 may be interested in and/or capable of processing, and/or various capabilities of one or more of the listeners 140, 141, 142. A listener attribute or property may additionally or alternatively specify various other pieces of information and/or data about one or more of the listeners 140, 141, 142. One listener attribute or listener property may include multiple pieces of information and/or data. In some systems, each listener attribute or property may be related to only one piece of information and/or data, and each listener 140, 141, and 142 may have multiple listener attributes. In other systems, each listener 140, 141, and 142 has only one listener characteristic which specifies multiple pieces of information and/or data about the listeners. The listener attributes may exist and/or be used within or outside of SRP and/or may include some or all of the listener attributes or properties described. Various combinations are possible.

One or more of the listeners 140, 141, 142 may respond to a stream advertisement sent by the talker 130. The response message may be, for example, a Listener Ready (LR), a Listener Ready Failed (LRF), and/or a Listener Asking Failed (LAF) message. As previously described, the LR message may indicate that one or more of the listeners 140, 141 is requesting attachment to the data stream, and that there is sufficient bandwidth and resources along one or more paths to the talker 130 for all of the listeners 140, 141 to receive the data stream. The LRF message may indicate that more than one of the listeners 140, 141 are requesting attachment to the data stream, and that one of the listeners 140, 141 has sufficient bandwidth and resources along the path to receive the data stream, but one or more of the listeners 140, 141 is unable to receive the data stream because of network bandwidth and/or resource allocation problems. The LAF message may indicate that one or more of the listeners 140, 141 are requesting attachment to the data stream, but that none of the listeners 140, 141 are able to receive the data stream because of network bandwidth and/or resource allocation problems. One or more of the listener attributes may be included in the LR message, the LRF message, and/or the LAF message. The talker 130 may receive the response message, and in response to receiving the message, the talker 140 may reserve and/or establish one or more paths to one or more of the listeners 140, 141 and/or send the data stream to the one or more of the listeners 140, 141.

Talker/listeners 150 may be configured, adapted, operable, and/or enabled to send and receive information and/or data through the network 110. A talker/listener 150 may include the capabilities and functions of a talker 130 and a listener 140. In some systems, all devices connected with the network 110 may be talker/listeners 150. In other systems, some or none of the devices connected with the network 110 may be talker/listeners 150. While the following discussion may only refer to talkers 130 and listeners 140 individually, it should be appreciated that in some systems, functions and attributes of talkers 130, 131, and 132 and/or listeners 140, 141, and 142 discussed may be accomplished by talker/listeners 150. Various combinations are possible.

The system may include one or more controllers 190. The controller 190 may or may not be or include a portion or all of the features of a computer system, such as a computer system 1000 shown in FIG. 10 and described later. The controller 190 may be Ethernet AVB enabled and/or compatible. The controller 190 may be configured, adapted, operable, and/or enabled to communicate with and/or through an Ethernet AVB network, such as according to, through, and/or with one or more standards or protocols, such as the stream reservation protocol outlined in IEEE 802.1Q. Alternatively, various other protocols, such as a MMRP, may be used.

The controller 190 may be or comprise an application level interface that is configured to communicate directly or indirectly with the talkers 130, 131, 132, the listeners 140, 141, and 142, the talker/listener 150, and the client 160. The controller 190 may be configured to manage and/or control a connection of a data stream between two or more devices, such as between the talker 130 and the listener 140. The controller 190 may be configured to communicate with a client 160. The client 160 may be a device that desires to establish and/or tear down a data stream between two devices. For example, the client 160 may be a remote control. The remote control may be configured to issue a command, such as a "Play" command, to the controller 190 which instructs the controller 190 to establish a connection between a Digital Versatile Disc (DVD) player and a television and/or speakers in order to play a DVD. In FIG. 1, the controller 190 may communicate with the client directly, or through the network 110. Various other communications and interactions between the controller 190 and talkers 130, 131, and 132 and/or listeners 140, 141, and 142 are possible. In addition, in some examples, such as when the talkers 130, listeners 140, and listener/talkers 150 are self configured, the controller 190, and/or the client 160 may be omitted.

Figure 2:
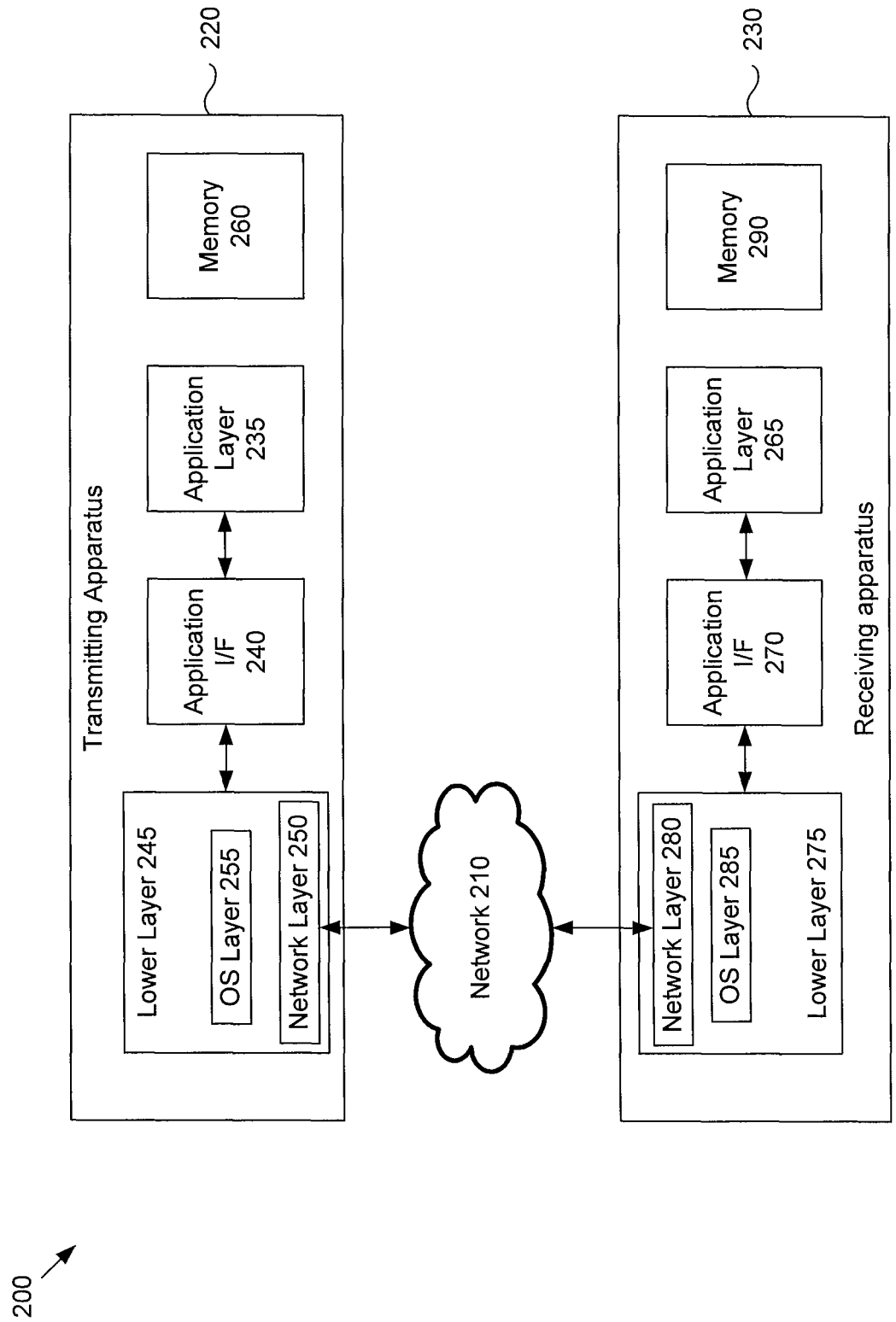
FIG. 2 is a block diagram of an example network communication system showing a transmitting apparatus and a receiving apparatus.

FIG. 2 is a block diagram of an example network communication system 200 that includes a first apparatus 220 in communication with a second apparatus 230 over a network 210. The network 210 may be an Ethernet AVB network. The first apparatus 220 and/or the second apparatus 230 may be configured to perform one or more roles, such as the role of the talker, the role of the listener, the role of the talker/listener, the role of the client, and/or the role of the controller, as previously described. In addition or as part of performing the roles, the first apparatus 220 and the second apparatus 230 may be configured to send and/or receive application-layer messages to control and/or that are used in the control of flow of data streams between the first device 220 and the second device 230. The application-layer messages may be messages that are generated and/or processed by one or more applications configured in an application layer of the first apparatus 220 or the second apparatus 230. The one or more applications and/or the application layers of the apparatus 220 or the apparatus 230 may be referred as an application layer module. The first apparatus 220 may include an application layer module 235. The second apparatus may include an application layer module 265.

The application layer modules 235, 265 may be in communication with application interface modules 240, 270 and lower layer modules 245, 275. The application layer modules 235, 265, the application interface modules 240, 270, and/or the lower layer modules 245, 275 may communicate with each other to send and/or receive the application-layer messages over the network 210. As an example, the application layer modules 235, 265 may be configured to determine to generate the application-layer message. The lower layer modules 245, 275 may be configured to send the application-layer message over the network 210. The application interface modules 240, 270 may provide an interface between the application layer modules 235, 265 and the lower layer modules 245, 275. As another example, the lower layer modules 245, 275 may be configured to receive the application-layer message from over the network 210. The lower-layer modules 245, 275 may include network layer modules 250, 280 and operating system (OS) layer modules 255, 285. The network layer modules 250, 280 may be configured to perform one or more functions, services, and/or tasks to communicate with the network 210 and send and/or receive the application-layer message from over the network 210. The operating system layer modules 255, 285 may be configured to perform other lower-layer functions, services, and/or tasks that the network layer modules 250, 280 may not be configured to perform, such as controlling a timer, as described in more detail below.

For each of the first apparatus 220 and the second apparatus 230, to send and/or receive the application layer-messages, each of the modules of the apparatus, such as modules 235, 240, 245 of the first apparatus 220 or modules 265, 270, 275 of the second apparatus 230, may instruct and/or request one or more of the other modules of the apparatus to perform one or more functions, tasks, and/or services. In turn, the modules that received the request or instruction may be configured to perform the function, task, or service. In addition, each module may be configured to determine whether it is able to completely perform the requested or instructed function, task, or service. If the module determines that it is unable to completely perform the function, task, or service, then the module may be configured to communicate with another module and request or instruct the other module to perform one or more functions, tasks, or services.

In addition, as part of, and/or in response to performing the function, task, or service, the module may be configured to return one or more signals, messages, data structures, data and/or other information to the module that requested or instructed the function, task, or service be performed. Alternatively or in addition, in response to receipt of the request or instruction, the module may configured to send one or more signals, messages, data structures, data, and/or other information to a module other than the requesting or instructing module.

The modules may communicate with each other by sending messages to and from each other. The messages may indicate the functions, tasks, or services that are to be performed. Alternatively, in addition, or as part of sending the messages, the modules may request or instruct that the functions, tasks, or services be performed by performing function calls. When a module calls a function, the calling module may indicate a different module that is to perform the task or service, and/or one or more arguments, callbacks, or other parameters or instructions that may be used to perform the function, task, or service. One or more callback data structures may be used by the application interface modules 240, 270 to communicate and/or interface with the application layer modules 235, 265 and/or the lower layer modules 245, 275. A callback data structure may be a data structure that contains information that may be used to register one or more functions that are provided by the application layer modules 235, 265 and/or the lower layer module 245, 265. When the data structure is registered, the application interface modules 240, 270 may reference and/or identify the functions provided by the application layers 235, 265 and/or the lower layer modules 245, 275 and may be configured to call those functions.

In some roles, such as the talker and/or the listener roles, the application layer modules 235, 265 may be configured to perform one or more functions on the data stream. The data stream may be an A/V data stream containing audio and/or video data. The functions that may be performed on the A/V data stream may include, but are not limited to, starting (e.g., "playing"), stopping, forwarding, fast-forwarding, rewinding, pausing, adjusting volume, muting, and/or any other function that may be performed on audio and/or video data. The application layer modules 235, 265 may be configured to perform the functions in response to receipt of an application-layer message. Although not shown, the application layer modules 235, 265 may include individual applications, application blocks, or application modules that may each be configured to perform a single function. Alternatively, the individual applications, application blocks, or application modules may be configured to perform more than one function, less than all available functions that may be performed at the application layer, or all of the available functions.

An example application-layer message may be a control message. The control message may include one or more data parameters that may be used to control the flow of the data stream. The first apparatus 220 and/or the second apparatus 230 may be configured to send the control message and/or receive the control message. The application layer modules 235, 265, the application interface modules 240, 270, and the lower-layer modules 245, 275 of the first and second apparatuses 220, 230 may be configured to perform functions associated with sending the control message and other functions associated with receiving the control message. For the following description, the functions associated with sending the control message are described with reference to the first apparatus 220 and the application layer module 235, the application interface module 240, and the lower-layer module 245 of the first apparatus 220. The first apparatus 220 may be referred to as a transmitting apparatus. In addition, the functions associated with receiving the control message are described with reference to the second apparatus 230 and the application layer module 265, the application interface module 270, and the lower-layer module 275 of the second apparatus 230. The second apparatus 230 is referred to as a receiving apparatus.

The application layer module 235 of the transmitting apparatus 220 may be configured to determine to generate and/or send the control message over the network 210 and/or to the receiving apparatus 230. As an example, the transmitting apparatus 220 may be a client, such as the client 160 in the system 100. The application layer module 235 of the client may be configured to determine to send the control message by being in communication with an input device or a user interface, such as a user interface of a head unit 1060 of an automobile as described below in FIG. 10. A user of the user interface may provide an input on the input device to control a function to be performed on the A/V data. The input may be indicative of an operation associated with the function. For example, "play" and "stop" user inputs may control a "playing" function by performing "start playing" and "stop playing" operations on the A/V data. In response to determining the input, the client, functioning as the transmitting apparatus 220, may determine to generate and/or send a control message to control the function to be performed on the A/V data, such as sending a control message to "start" or "stop" the "playing" of the A/V data.

As another example, the transmitting apparatus 220 may be a controller, such as the controller 190 in the system 100. The application layer 235 of the controller may determine to generate and/or send a control message to one or more talkers, one or more listeners, one or more talker/listeners 150, and/or one or more clients 160, such as talkers 130, 131, 132, listeners 140, 141, 142, talker/listener 150, and/or client 160 of the system shown in FIG. 1. The application layer 235 of the controller may determine to generate and/or send the control message to the talkers, listeners, and/or talker/listeners to establish or remove a path or connection between the talkers, listeners, and/or talker/listeners. The path may be established or removed so that an input, such as the "play" or "stop" inputs described above, can be performed. For example, the controller may receive a message from the client to control the flow of a data stream, such as to start or stop the A/V data. In response to receiving the message, the application layer 235 of the controller may determine to generate and/or send a control message to a talker or a talker/listener to create, remove, or reserve a path over which to send the data stream. In addition, application layer 235 of the controller may be configured to send a control message to a listener or a talker/listener to connect to or remove connection from the path.

In response to determining to generate and/or send the control message, the application layer module 235 of the transmitting apparatus 220 may be configured to generate the control message. The application layer module 235 may generate the control message by requesting or retrieving a data structure and assigning and/or inserting control message information into the data structure. The data structure may be a blank or empty or a partially blank or partially empty data structure. For example, the data structure may include one or more data fields that contain no information or less than all of the information that the data fields may have when the control message is ready to be sent over the network 210. The application layer module 235 may request the data structure from the application interface module 240. The application layer module 235 may request the data structure by sending a message to the application interface module 240 that indicates that the application layer module 235 wants to transmit the control message. The message may include one or more size parameters that indicate a size or sizes of one or more data parameters to be included in the control message. The data parameters may be used to control the flow of the data stream.

In addition or alternatively, the message may indicate a request to allocate one or more data buffers to store the control message and/or to store the data parameters to be included in the control message. The buffers may be used to store and/or hold the control message and/or all or some of the data parameters to be included in the control message before the control message is transmitted. A size of the buffer that stores the data parameters may be a size indicated by the size parameter, although other size data buffers may be used. One or more of the buffers may be or may not be part of memory 260. The memory 260 may be volatile memory or non-volatile memory. In FIG. 2, the memory 260 is a component of the transmitting apparatus 220.

In response to receipt of the message from the application layer module 235, the application interface module 240 may be configured to send a message back to the application layer module 235 that includes the empty or partially empty data structure. In addition, alternatively, or as part of sending the message back to the application layer module 235, the application interface module 240 may be configured to allocate the data buffers to store and/or hold the control message and/or all or some of the data parameters. Where the message received by the application interface module 240 included the size parameter, the application interface module 240 may be configured to allocate a data buffer for the data parameters having a size of the size parameter. The application interface module 240 may also be configured to manage the one or more data buffers. For example, the application interface module 240 may be configured to deallocate the data buffers and/or release the control message and/or the data parameters from the data buffers in response to receipt of one or more signals or messages indicating that the control message is ready to be sent over the network 210. Alternatively, the application interface 240 may receive a control message that does not include the size parameter or includes a size parameter that indicates a size of zero. Where the size parameter is not included in the message sent by the application layer module 235 or the size parameter indicates a size of zero, then a data buffer for only the control message is allocated and the application layer module 235 is responsible to allocate, deallocate, or otherwise manage one or more data buffers for the data parameters.

In response to receipt of the message that includes the data structure, the application layer module 235 may be configured to provide, such as by assigning or inserting, information to one or more data fields in the data structure that may be included the control message that is sent to the receiving apparatus 230 and/or that controls the flow of the data stream. The information may be and/or may include one or more of the data parameters. The application layer module 235 may be configured to determine what particular information and/or the types of data parameters to include in the data structure based on the application layer module's 235 initial determination that the control message is to be sent over the network 210, such as by determining a user input on an input device as previously described. As an example, the application layer module 235 may be configured to assign one or more parameters in the data structure associated with creating a path for the data stream based on the application layer modules's 235 determination of a "play" user input. As another example, the application layer module 235 may be configured to insert one or more data parameters in the data structure associated with removing a path for the data stream based on the application layer module's 235 determination of a "stop" user input. Other data parameters and/or other information may be provided in the data structure. Alternatively, in addition, or as part of, the application layer module 235 may be configured to store the data parameters in the one or more buffers that were allocated.

After the control message information is inserted into the data structure, the application layer module 235 may be configured to send a message that includes the data structure to the application interface module 240. The message may also expressly or implicitly indicate that the control message has been generated and/or is ready to be sent over the network 210. In one example, the message may indicate that all of the information and/or data parameters are stored in the one or more data buffers.

In response to receipt of the message from the application layer module 235, the application interface module 240 may be configured communicate and/or operate with the lower-layer module 245 to convert the data structure and/or information included in the data structure into a control message having a packet format that is suitable for transmission over the network 210. As described in more detail below, the packet format may be a time-length-value (TLV) format. The lower-layer module 245 may include a network layer module 250 that is configured to send the control message over the network 210. The application interface module 240 may communicate with the network layer module 250 to utilize one or more functions, tasks, and/or services of the network layer module 250 to send the control message over the network 210. In other example embodiments, the application interface module 240 may be configured to send the control message over the network 210 without requesting the functions and/or services of the network layer module 250. Alternatively, in addition, or as part of sending the control message to the network layer module 250, the control message and/or the data parameters that are stored in the one or more data buffers may be released from the data buffers. In addition or alternatively, the data buffers may be deallocated. The application layer module 235 or the application interface module 240 may release the control message and/or the data parameters, and/or deallocate the one or more data buffers depending on which of the modules 235, 240 is responsible for managing the data buffers, as previously described.

In one example, the network layer module 250 may receive the control message and/or a request to send the control message over the network 210 from the application interface module 240 or another module of the lower-layer module 245. In response to receipt of the control message and/or the request to send the control message over the network 210, the network layer module 250 may be configured to send the control message over the network 210. As previously described, the network 210 may be an Ethernet AVB network. The network layer module 250 may be configured and/or provide one or more functions and/or services that may be requested by the application layer module 235 and/or the application interface module 240. The network layer module 250 may be configured and/or provide the capability to transfer and/or route the control message and/or other streams or packets of information having sequences of data of varying length from the transmitting apparatus 220 to the receiving apparatus 230. The network layer may be used in accordance with one or more protocols used to send the control message over the network 210, including Internet Protocol (IP), Distance Vector Multicast Routing Protocol (DVMRP), Internet Control Message Protocol (ICMP), Internet Group Multicast Protocol (IGMP), Protocol Independent Multicast Sparse Mode (PIM-SM), Protocol Independent Multicast Dense Mode (PIM-DM), Internet Protocol Security (IPsec), Internetwork Packet Exchange (IPX), Routing Information Protocol (RIP), Datagram Delivery Protocol (DDP), and/or Border Gateway Protocol (BGP), as examples.

Figure 3:
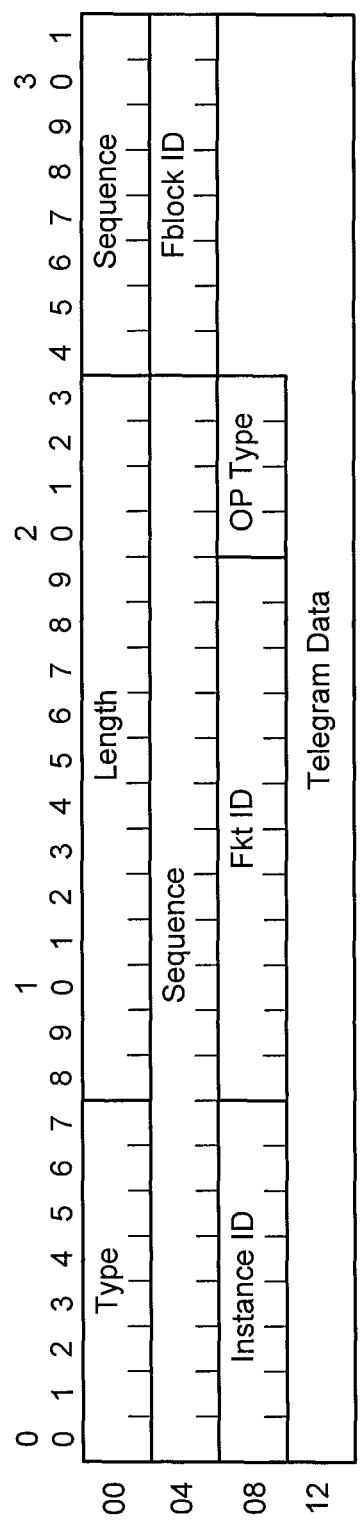
FIG. 3 is a diagram of a format of a control message.

FIG. 3 is a diagram of an example packet format of a control message. The packet format of the control message may be a type-length-value (TLV) format. The data structure having the TLV format may include a type data field, a length data field, and a value data field. The application layer module 235 may insert and/or assign one or more data parameters to the type, length, and value data fields as part of the generation of the control message. The type data field may comprise a type indicator that indicates that the data structure is the control message. As described in more detail below, the type indicator may be used to distinguish the control message from other types of application-layer messages. Other types of application-layer messages may include acknowledgement messages, negative acknowledgement messages, and/or synchronization messages, as described in more detail below. The type data field and/or the type indicator may have a size or length of eight bits, although other sizes or lengths may be used.

The length data field may include a length indicator that indicates a length of the TLV data structure. In one example, the length indicator may indicate a count of an entire length of the TLV data structure less a length of the type field and a length of the length field. The length indicator may be used to indicate to the receiving apparatus 230 the size and/or amount of data, including the data parameters used to control the data stream, to be processed. The size or length of the length field may be sixteen bits, although other lengths may be used.

The value data field may include a sequence number indicator that indicates a sequence number that uniquely identifies the TLV element. In one example, the sequence number indicator has a size of thirty-two bits, although other sizes may be used. The value data field may further include one or more identification fields that identify the receiving apparatus 230 to which the control message may be sent. The one or more data fields may include an identification field, denoted as FBlock ID in FIG. 3, that identifies the type of device. For example, a control message that is to start the playing of a DVD may include an identification field that identifies a DVD player. The FBlock ID data field may have a size of 8 bits, although other sizes may be used. In addition, in a system where there are multiple devices of the same type, the one or more identification fields that identify the receiving apparatus 230 may include an identification field, denoted as instance ID in FIG. 3, that identifies which of the devices having the same type that the control message is to be sent. As an example, in a system where there are multiple 1.0 speakers, some being "front" speakers and others being "rear" speakers, a control message that is being sent to "mute" the front speakers so that audio is being output from only the rear speakers may include one or more instance IDs that identify the front speakers. Where the system includes only one device of a particular type, then the instance ID may indicate a "one" value. For example, in a system where there is only one DVD player, the instance ID may indicate a "one" value to indicate that the DVD player is the first and only device in the system. The instance ID may have a size of 8 bits, although other sizes may be used.

The receiving apparatus 230, such as through the application layer 265, may be configured to perform one or more functions. The functions may be classified into two different categories, property and method. The property function is indicative of a data value or a parameter that the receiving apparatus 230 may be directed to set and/or report the value of back to the sending apparatus. A method function may be a function that is indicative of a task that the receiving apparatus 230 may perform. To identify the one or more functions to be performed by the receiving apparatus 230, the value data field in the control message may include an identification field, denoted as Fkt ID in FIG. 3, that identifies the one or more functions that the receiving apparatus 230 may perform. The value data field may further include an operation type field, denoted as OP Type in FIG. 3, that identifies a type of operation that is performed on the function and/or is used to manipulate the function. The OP Type field may have a size of 4 bits, although other sizes may be used. The operation types may be a fixed set of operations that may be applied to the various functions and/or may depend on whether the function is a property or a method. Example operation types associated with property functions are "set," which sets one or more parameters or data values of the receiving apparatus 230; "get," which gets, retrieves, and/or obtains one or more parameters or data values from the receiving apparatus 230, "setget," which both sets one or more data values or parameters to and then receives the same data values or parameters from the receiving apparatus 230, "status," with which the receiving apparatus 230 reports one or more data values or parameters, and "error," with which the receiving apparatus 230 reports one or more errors. Operation types associated with method functions may "invoke" the method. Example operation types associated with method functions may include "Start," "Start Result," "StartResultAck," "Abort," "AbortAck," "Processing," "ProcessingAck," "Result," and "ResultAck."

A control messages including the value data field may be one-directional. In addition, upon receipt of the control message, the control message may prompt the receiving apparatus 230 to send a reply message. For example, a transmitting apparatus 220 sending a control message that includes a "Get" OpType may prompt the receiving apparatus 230 to send a reply message that includes a "Status" OpType. Receipt of a control message that includes the "Set" OpType on the other hand may not prompt a reply message. The "SetGet" OpType may instruct the receiving apparatus 230 to set a new value and also prompt the receiving apparatus 230 to send the new value in reply in a "Status" message so the setting of the new value may be confirmed.

Each OpType may be sent by the sending apparatus 220 or sent by the receiving apparatus 230 in reply to receipt of the control message from the sending apparatus 220. Control messages sent by the transmitting apparatus 220 may be denoted as "commands." Reply messages sent by the receiving apparatus 230 in response to receipt of the "command" message sent by the transmitting apparatus 220 may be denoted as "reports." Control messages that include "Get", "Set", and "SetGet," may be sent by the transmitting apparatus 220. Control messages including "Status" and "Error" OpTypes may be sent by the receiving apparatus 230. Control messages that include an OpType associated with method functions, including "Start", "StartResultAck," and "AbortAck" may be sent by the transmitting apparatus 220. Reply messages that include "ProcessingAck" and "ResultAck" may be sent by the receiving apparatus 230 in response. The receiving apparatus 230 may also send reply messages including the OpTypes "Processing" and "Result," but in response to control messages including OpTypes "StartResult" and "Abort." A control message including the OpType "StartResultAck," may instruct the receiving apparatus 230 to start a process that may take a while to complete. If the receiving apparatus 230 finishes the process within a predetermined time threshold, the receiving apparatus may send a reply message with the OpType "ResultAck" to the sending apparatus 220 when the process is completed. If processing exceeds the predetermined threshold, the receiving apparatus 230 may periodically send a reply message having the OpType "ProcessingAck" to notify the transmitting apparatus 220 that the receiving apparatus 230 is still processing. The sending apparatus 220 may abort the long-running process with a control message that includes the OpType "AbortAck." When there is an error in the processing or when the receiving apparatus 230 is instructed to abort the processing, the receiving apparatus 230 may send a reply message that includes the OpType "Error" back to the transmitting apparatus 230. Messages that include OpTypes "Status" and "ResultAck" may be similar. Also, the OpTypes "status" and "result" may share the same OpType ID of 0xC. A difference between the OpTypes "Result" and "ResultAck" may be an extra parameter that helps the transmitting apparatus 220 keep track of which command message to which the reply message corresponds.

Using the DVD player example above, an example control message may be sent to the receiving apparatus 230 to determine a playback state, such as "playing," "stopped," or "paused," of the DVD player. In this example, the control message may include a function ID that identifies a property function, "playback state." Also, the control message may include an OpType having the type "get," which may be used to "get" or obtain the playback state of the DVD player. Another example control message may be sent to the receiving apparatus 230 to begin playing a DVD on the DVD player. In this example, the control message may include a function ID that identifies a method function, "play." Also, the control message may include an OpType having the type "Start," which may be used to invoke (i.e., start) playing the DVD.

The value data field may further comprise a data field, denoted as Telegram Data in FIG. 3, that comprises the one or more data parameters used to control the flow of the data stream. The data parameters may be used to perform the operation on the function.

For example, a control message that is to start the playing of the DVD may include data parameters indicating the DVD that is to be played (e.g., if the DVD player holds multiple DVDs), a time or position at which the DVD is to begin playing, or any other information that the DVD player may need in order to establish a data stream to begin playing the DVD as desired.

Before being sent over the network 210, the control message may be included in a data packet. The network layer module 250 or alternatively another module of the lower-layer module may be configured to include the control message in the data packet. The data packet may be generated and/or formatted in accordance with a User Datagram Protocol (UDP). The data packet may be referred to as a datagram. The control message may be referred to as a telegram. One datagram may contain one or more telegrams. For example, one datagram may include a first telegram that instructs the DVD player to establish a data stream to begin playing a DVD and a second telegram that instructs the DVD player to provide subtitles when playing the DVD. At a minimum, a datagram may include one telegram, and the telegram may be entirely contained in the datagram. A maximum size of the datagram in accordance with the UDP may be 65,535 bytes. Where the telegram has the TLV format as previously described, the Telegram Data data field may not exceed the maximum size of the datagram.

Figure 4:
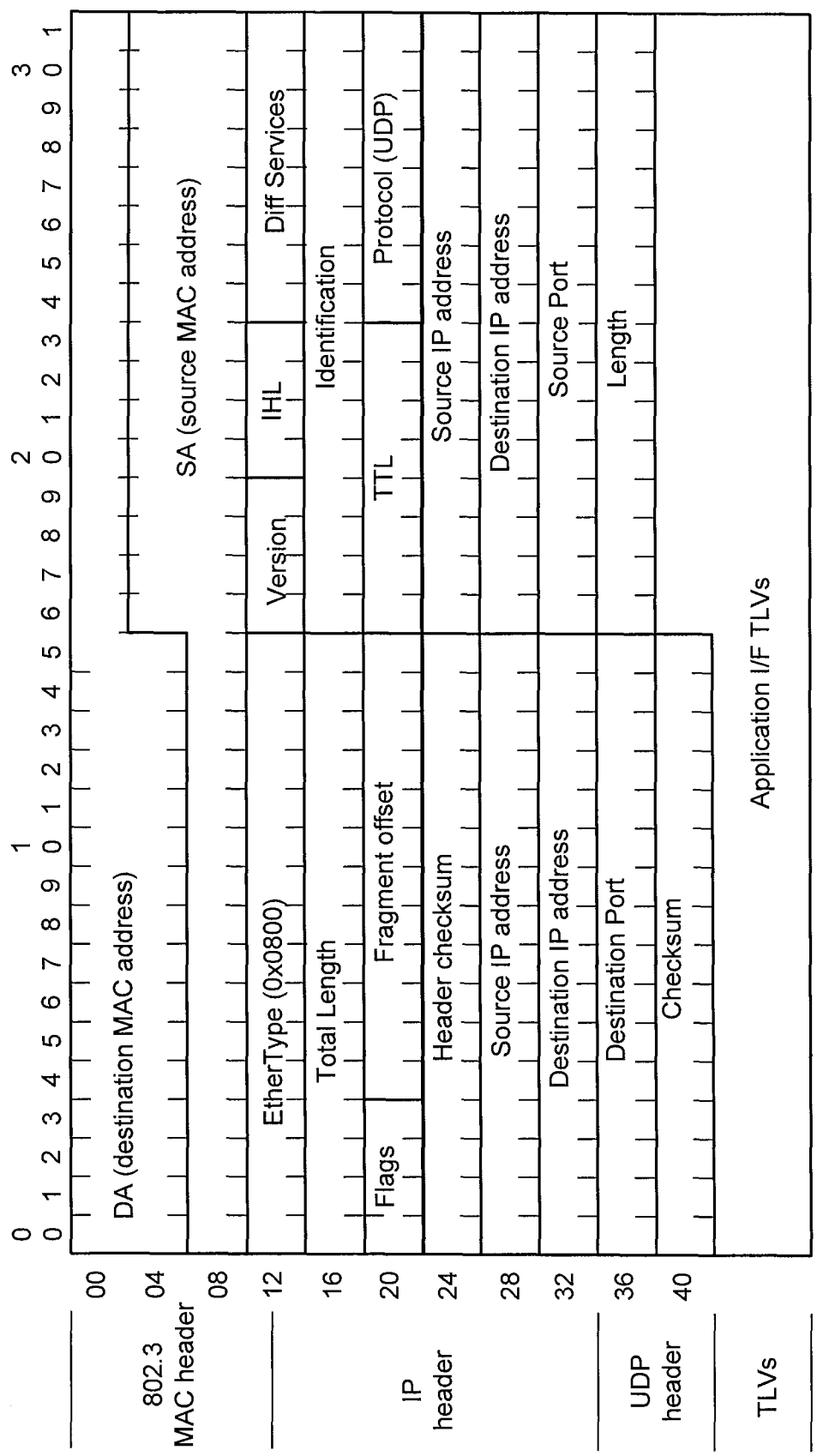
FIG. 4 is a diagram of a format of a data packet that includes the control message.

FIG. 4 is a diagram of a format of an exemplary UDP datagram. In addition to one or more telegrams, the datagram may include one or more header data fields, including one or more Media Access Control ("MAC") header data fields, one or more Internet Protocol ("IP") header data fields, and/or UDP header data fields. The MAC header data fields may be configured in accordance with an Institute of Electrical and Electronics Engineers (IEEE) 802.3 protocol. The one or more MAC header data fields may include a destination MAC address field and a source MAC address field. The IP header data fields may include an EtherType field; a version field; an Internet Header Length (IHL) field, which is a length of an IP packet header; a differentiated services field, which marks different classes of traffic for service discrimination in routing on the internet; a total length field; an identification field; one or Flags fields; a fragment offset field; a time to live (TTL) field; a UDP protocol field; a header checksum field; a source IP address field; a destination IP address field; and a source port field. The one or more UDP header data fields may include a destination port field, a length field, and a checksum field. The UDP headers may be part of the standard UDP protocol from the TCP/IP stack. They provide a basic multiplexed datagram service that does not guarantee delivery, but ensures that a delivered datagram was not corrupted in transit.

Referring back to FIG. 2, after transmitting the control message (e.g., one or more telegrams in a datagram), the transmitting apparatus 220 may be further configured to verify that the control message is received by the receiving apparatus 230. The transmitting apparatus 220 may verify that the control message is received by being configured to determine and/or establish an "acknowledgement and retry" scheme. The acknowledgement and retry scheme may include a determination and/or an establishment of a timeout period for which the application interface module 240 may wait before resending the control message. In one example, the application interface module 240 may establish the timeout period by requesting or instructing one or more timeout services to be performed by an operating system layer module 255 of the lower layer module 245. The timeout services may include setting a timer. The application interface module 240 may request and/or instruct that the operating system layer module 255 set the timer by sending a message that includes one or more parameters that indicate the timeout period. The message may also include a parameter that indicates a start time to start the timer. The parameters may indicate the timeout period and/or the start time in any unit of time, including seconds, milliseconds, microseconds, nanoseconds, or any combination thereof. The operating system layer module 255, or a different module of the lower layer module 245, may be configured to, in accordance with the timeout parameters, set the timeout period, start the timer, monitor the timer, and/or determine if or when the timer expires. When the timer has expired, the operating system layer module 255 may be configured to notify, such as by sending a message to, the application interface module 240 of the expiration. In response to receipt of the expiration message from the operating system layer module 255, the application interface module 240 may be configured to request and/or instruct the network layer module 250 to resend the control message over the network 210.

The acknowledgement and retry scheme may further include a determination and/or a reception of one or more acknowledgment messages or negative acknowledgment messages. An acknowledgement message may indicate that the control message was successfully received. A successful reception may indicate that the control message was received by the receiving apparatus 230 and the receiving apparatus 230 has enough available resources to process the control message. Having enough resources may include that the receiving apparatus 230 is able to process the control message after receipt without the control message having to be stored in memory before it is processed, or that the receiving apparatus 230 has enough memory (e.g., buffer memory configured as a stack or a queue) available to store the control message until the receiving apparatus 230 is able to process the control message. The negative acknowledgement message may indicate that the control message is unsuccessfully received. An unsuccessful reception may indicate that the control message was received by the receiving apparatus 230, but the receiving apparatus 230 does not have enough available resources to process the control message. Not having enough available resources may include not being able to process the control message at any time, or at or around the time of receipt of the control message, the receiving apparatus does not have enough available memory to store the control message until the control message is able to be processed.

FIGS. 5 and 6 are diagrams of example formats of the acknowledgement message and the negative acknowledgment message, respectively. Similar to the control message, the acknowledgement message and/or the negative acknowledgement message may comprise data structures having a TLV format. FIG. 5 shows the TLV format of the acknowledgement message, which may include a type field, a length field, and a value field. The type field may include a type indicator that indicates that the received message is an acknowledgement message. The type indicator may be used to distinguish the acknowledgment message from other protocol-layer message, including the control message, the negative acknowledgement message, and/or the synchronize message, as described in more detail below. The type data field and/or the type indicator may have a size or length of eight bits, although other sizes or lengths may be used. The length data field may include a length indicator that indicates a length of the TLV data structure. In one example, the length indicator may indicate a count of an entire length of the TLV data structure less a length of the type field and a length of the length field. The size or length of the length field may be sixteen bits, although other lengths may be used. The value data field may include a sequence number that correlates with one or more sequence numbers of control messages that were received. In one example, the sequence number indicator has a size of thirty-two bits, although other sizes may be used. The acknowledgement message may not include a data field having one or more data parameters to control the flow of the data stream. Where the acknowledgement message does not include the data field, the length indicator may indicate the length of the sequence number only.

FIG. 6 shows the TLV format of the negative acknowledgement message, which may include a type field, a length field, and a value field. The type field may include a type indicator that indicates that the received message is a negative acknowledgement message. The type indicator may be used to distinguish the negative acknowledgment message from other protocol-layer messages, including the control message, the acknowledgement message, and/or the synchronize message, which is described in more detail below. The type data field and/or the type indicator may have a size or length of eight bits, although other sizes or lengths may be used. The length data field may include a length indicator that indicates a length of the TLV data structure. In one example, the length indicator may indicate a count of an entire length of the TLV data structure less a length of the type field and a length of the length field. The size or length of the length field may be sixteen bits, although other lengths may be used. The value data field may include a sequence number that correlates with one or more sequence numbers of control messages that were received. In one example, the sequence number indicator has a size of thirty-two bits, although other sizes may be used. In addition, the value field may also include one or more cause indicators, denoted as Cause in FIG. 6, that indicate one or more reasons that the control message was not able to be processed. An example reason may be that the receiving apparatus 230 has received more messages than it has been able to process and has no more buffer space to receive this control message. Another example reason may be that the apparatus 230 is in the process of entering a low-power state and will no longer accept any messages. The cause field and/or the cause indicator may have a size or length of thirty-two bits, although other sizes or lengths may be used.

Each acknowledgement message and/or each negative acknowledgement message may be referred to as a telegram. One or more telegrams may be communicated over the network 210 by being included in a data packet, such as a UDP datagram as previously described. As examples, a datagram may include one or more acknowledgement telegrams, one or more negative acknowledgement telegrams, or a combination of one or more acknowledgement telegrams and one or more negative acknowledgement telegrams. The number of acknowledgement telegrams and the number of negative acknowledgement telegrams received by the transmitting apparatus 220 may correspond to the number of control message telegrams sent in a datagram by the transmitting apparatus 220. As an example, if the transmitting apparatus transmits a datagram that includes two control message telegrams, the receiving apparatus 230, upon receipt of the datagram, may determine that the receiving apparatus 230 can process one of the control message telegrams but not the other control message telegram. Accordingly, the transmitting apparatus 220 may receive from the receiving apparatus 230 a datagram that includes an acknowledgement telegram and a negative acknowledgement telegram.

The transmitting apparatus 220 may be configured to receive a datagram that includes one or more acknowledgement messages and/or one or more negative acknowledgement messages at and/or using the functions and/or services of the network layer module 250. In response to receipt of the datagram, the network layer module 250 may be configured to notify, such as by sending a message to, the application interface module 240 of the receipt of the datagram. The notification to the application interface module 240 may include an indication of whether the datagram is an acknowledgement message or a negative acknowledgement message. In response to receipt of the notification from the network layer module 250, the application layer interface 240 may be configured to request and/or instruct, such as by sending a message to, the operating system layer module 255 to cancel the timer. Alternatively or in addition, the application interface module 240 may be configured to provide a status to the application layer module 235. The status may correspond to the notification and/or may be indicative of whether the received telegram was an acknowledgment telegram or a negative acknowledgment telegram. For example, the status may be indicative of whether the control message was successfully received or unsuccessfully received, as previously described. One status message may be sent to the application layer module 235 for each control message telegram that was included in the datagram.

After the control message, or the datagram including the control message telegram, is sent by the transmitting apparatus 220 over the network 210, the receiving apparatus 230 may be configured to receive the datagram at the network layer module 280. In response to receipt of the datagram, the network layer module 280 may be configured to notify, such as by sending a message to, the application interface 270 that the control message was received. In response to receipt of the notification from the network layer module 280, the application interface 270 may be configured to determine whether there are resources available in the application interface 270 to process the control message. For example, the application interface 270 may determine whether there is enough memory available to store the control message until the control message is able to be processed. Based on the determination, the acknowledgement message or the negative acknowledgement message may be generated. The acknowledgement message and/or the negative acknowledgement message may be formatted in a TLV format as previously described. The acknowledgement message or the negative acknowledgement message may include a sequence number that corresponds to the sequence number that was included in the control message. After the acknowledgement message or the negative acknowledgement message is created, the message may be included in a data packet, such as a UDP datagram as previously described. The datagram may then be sent over the network 210. In one example, the application interface 270 may be configured to generate the acknowledgement message or the negative acknowledgement message and include the message in the datagram. The application interface 270 may then instruct and/or request the network layer module 275 to send the datagram over the network 210. As part of sending the message, the network layer module 280 may be configured to include the acknowledgement message or the negative acknowledgement message in the data packet and then send the data packet over the network 210. Other configurations are possible.

Where the datagram received by the receiving apparatus 230 includes more than one control message, the application interface module 270 may be configured to break out or divide the datagram into the individual control messages. A plurality of acknowledgement and/or negative acknowledgement messages may then be generated corresponding to the plurality of control messages. The plurality of acknowledgement and/or negative acknowledgement messages may then be included in a datagram and sent over the network 210.

After the acknowledgement and/or negative acknowledgement message is sent over the network 210, the application interface module 270 may be configured to notify the application layer module 265 that the control message was received, provided the application interface module 270 did not provide the notification before having the acknowledgement or negative acknowledgement message sent over the network 210. In addition, the application interface module 270 may provide the application layer module 265 with the control message and/or some or all of the information in the control message to be processed. If the received datagram included more than one control message telegram, the application interface 270 may be configured to send a message to the application layer module 265 for each control message telegram.

In response to the notification, the application layer module 265 may be configured to process the control message. Processing the control message may include performing one or more steps to create or remove a connection to a data stream. As an example, if the receiving apparatus 230 is a controller as previously described that receives a control message from a client to create a data stream, the controller may be configured to send one or more messages to a talker and/or a listener to establish the data stream. As another example, if the receiving apparatus 230 is a talker as previously described that receives a control message from the controller to create the data stream, the talker may perform one or more actions to create the data stream and/or reserve a path over which the data stream is to be sent. As another example, if the receiving apparatus 230 is a listener as previously described that receives a control message from the controller to connect to the data stream, the listener may perform one or more actions to connect to the data stream.

The application layer module 265 may also be configured to provide a status of whether the application layer module 265 is finished processing the control message or whether the application layer module 265 needs more time to process the control message. For example, after the application layer module 265 is finished processing the control message, the application layer module 265 may inform, such as by sending a message to, the application interface module 270 that the application layer module 265 is finished processing the control message. Upon receipt of the message, the application interface module 270 may reclaim all or some of the memory that was used to communicate the control message to the application layer module 265. Alternatively, the application layer module 265 may be configured to notify the application interface module 270 that the application layer module 265 needs more time to process the information. Then, after the application layer module 265 is finished processing the control message, the application layer module 265 may notify the application interface module 270 that the application layer module 265 is finished processing the control message. In response to receipt of the notification, the application interface module 270 may reclaim all or some of the memory that was used to communicate the control message to the application layer module 265. Where the application interface module 270 provides more than one control message or information related to more than one control message, the application layer module 265 may be configured to notify the application interface module 270 whether it is finished processing the control message for each of the control messages.

The transmitting apparatus 220 may be configured to send and the receiving apparatus 230 may be configured to receive another type of protocol-layer message called a synchronization message. The synchronization message may be used to synchronize a coordination of sequence numbers between the transmitting apparatus 220 and the receiving apparatus 230. The sequence numbers may be determined based on a sequential order of control messages being sent. Accordingly, the receiving apparatus 230 may be expecting to receive a control message having a sequence number that follows the sequence number of the control message that the receiving apparatus 230 previously received. If the control message has a sequence number that is out of order (i.e., the number does not follow the sequence number of the previously received control message), then the receiving apparatus 230 may be configured to reject the control message and/or label the control message or the data packet carrying the control message as corrupt. In some situations, the transmitting apparatus 220 may send a control message having a sequence number that does not follow the sequence number of the previously sent control message. For example, the transmitting apparatus 220 may undergo a reboot or a restart operation, and may be configured to restart or re-initialize the sequence number order. The transmitting apparatus 220 may be configured to send the synchronization message before or during the transmission of the control message to inform the receiving apparatus 230 of the restart of the sequence numbers. After receiving the synchronization message, the sequence numbers of the control messages that the transmitting apparatus 220 sends are in sync with the sequence numbers of the control messages that the receiving apparatus 230 is expecting to receive.

FIG. 7 shows a diagram of a format of an example synchronization message data structure. Each synchronization message may be referred to as a telegram. One or more telegrams may be communicated over the network 210 by being included in a data packet, such as a UDP datagram as previously described. FIG. 7 shows the TLV format of the synchronization message, which may include a type field, a length field, and a value field. The type field may include a type indicator that indicates that the received message is a synchronization message. The type indicator may be used to distinguish the synchronization message from other application-layer message, including the control message, the acknowledgement message, and/or the negative acknowledgement message. The type data field and/or the type indicator may have a size or length of eight bits, although other sizes or lengths may be used. The length data field may include a length indicator that indicates a length of the TLV data structure. In one example, the length indicator may indicate a count of an entire length of the TLV data structure less a length of the type field and a length of the length field. The size or length of the length field may be sixteen bits, although other lengths may be used. The value data field may include a sequence number. The sequence number may be used by the receiving apparatus 230 to synchronize the sequence numbers of the control messages being transmitted with the sequence numbers of the control message that the receiving apparatus 230 is expecting to receive. In one example, the sequence number indicator has a size of thirty-two bits, although other sizes may be used. The sequence message may not include a data field having one or more data parameters to control the flow of the data stream. Where the synchronization message does not include the data field, the length indicator may indicate the length of the sequence number only.

Other functions and/or calls to perform the functions of one or more of the application layer modules 235, 265, the application interface modules 240, 270, and/or the lower-layer modules 245, 275 are described. The application layer modules 235, 265 may be configured to call and/or the application interface modules 240, 270 may be configured to perform an initialization function. During the initialization function, the application interface modules 240, 270 may be configured to register one or more callback function destinations and/or set up one or more callback data structures of the application interface modules 240, 270. After the application interface modules 240, 270 perform the initialization function, the application interface modules may communicate with their respective application layer modules 235, 265 and/or lower-layer modules 245, 275.

The application interface modules 240, 270 may be configured to call and/or the OS layer modules 255, 285 may be configured to perform a lookup function. In some situations, a control message may be received by one of the application interface modules 240, 270 that does not indicate an IP address for the control message. In response to determining that the control message does not have an IP address, the application interface modules 240, 270 may be configured to request and/or instruct the OS layer modules 255, 285 to identify the IP address. The OS layer modules 255, 285 may be configured to identify the IP address based on the FBlock ID and/or the Instance ID that was included in the control message. After identifying the IP address, the OS layer modules 255, 285 may be configured to provide the IP address to the application layer interface modules 240, 270.

The application interface modules 240, 270 may be configured to call and/or the application layer modules 235, 265 may be configured to perform a filter function. If there are multiple application-layer messages to be sent, some of the application-layer messages may be handled differently than other application-layer messages. In that situation, the application layer modules 235, 265 may be configured to perform the filter function to separate the application-layer messages that have different handling requirements.

The application interface modules 240, 270 may further be configured to call and/or the application layer modules 235, 265 may further be configured to perform an error-logging function. If the application interface modules 240, 270 receive and/or identify a corrupt data packet or another type of error, the application interface modules 240, 270 may be configured to notify the application layer modules 235, 265 of the corrupt data packet. The application interface modules 240, 270 may also be configured to instruct and/or request the application layer modules 235, 265 to log or otherwise record the error or errors that caused the data packet to be corrupt. The application layer modules 235, 265, or other modules of the apparatuses 220, 230, may identify the cause and/or fix the errors based on the log and/or the record.

The transmitting apparatus 220 and the receiving apparatus 230 may communicate with and/or include memory and/or a database, such as memory 260 and/or memory 290, which the application layer modules 235, 265, the application interface modules 240, 270, and/or the lower-level layer modules 245, 275 may use to store information and/or data, such as information about the application-layer messages and/or the data streams that are received. In FIG. 2, the memory 260 and the memory 290 are separate components from the application layer modules 235, 265, the application interface modules 240, 270, and the lower-level layer modules 245, 275. In other embodiments, the memory 260 and/or the memory 290 may be part of the application layer modules 235, 265, the application interface modules 240, 270, and/or the lower-level layer modules 245, 275. Alternatively, the memory 260 and/or the memory 290 may be remote from the transmitting apparatus 220 and/or the receiving apparatus 230. Various other examples are possible.

The memory 260 and/or the memory 290 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 260 and/or the memory 290 may include a cache or random access memory for a processor, such as processor 1102 of computer system 1100 described later. In alternative examples, the memory 260 and/or the memory 290 is separate from a processor, such as a cache memory of a processor, the system memory, or other memory. The memory 260 and/or the memory 290 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 260 and/or the memory 290 may be operable to store instructions executable by a processor. The functions, acts or tasks illustrated in the figures or described may be performed by a programmed processor executing the instructions stored in the memory 260 and/or the memory 290. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

In some systems, the memory 260 and/or the memory 290 may be a separate and/or collective memory or database. The separate and/or collective memory or database may represent one database for both the transmitting apparatus 220 and the receiving apparatus 230. The separate and/or collective memory or database may be continuously updated, or updated at various other intervals. In some systems, the separate and/or collective memory or database may collect and/or update information based on information and/or data about the application-layer messages and/or the data streams received and/or stored in the memory 260 and/or the memory 290. Updates may be sent by the separate and/or collective memory or database to the memory 260 and/or the memory 290 at various intervals, such as every 10-15 seconds or so. In these systems, the memory 260 and/or the memory 290 may be the same.

In an alternative example, the memory 260 and/or the memory 290 may not be included in the transmitting apparatus 220 or the receiving apparatus 230, but may exist separately and/or be in communication with the transmitting apparatus 220 and/or the receiving apparatus 230. In another alternative example, parts of a separate and/or collective memory or database may be extracted from an external database and stored in volatile memory in the transmitting apparatus 220 and/or the receiving apparatus 230 when the transmitting apparatus 220 and/or the receiving apparatus 230 are powered up. Various other examples, functions and/or features of the memory 260 and/or the memory 290 are possible.

The application layer modules 235, 265, the application interface modules 240, 270, and/or the lower-level layer modules 245, 275 may comprise computer instructions, computer code, digital logic, other software, hardware, or any combination thereof a part of which may be stored in the memory 260, the memory 290, and/or any other storage device internal or external the transmitting apparatus 220 and/or the receiving apparatus 230, and that is executable by one or more processors.

Figure 8:
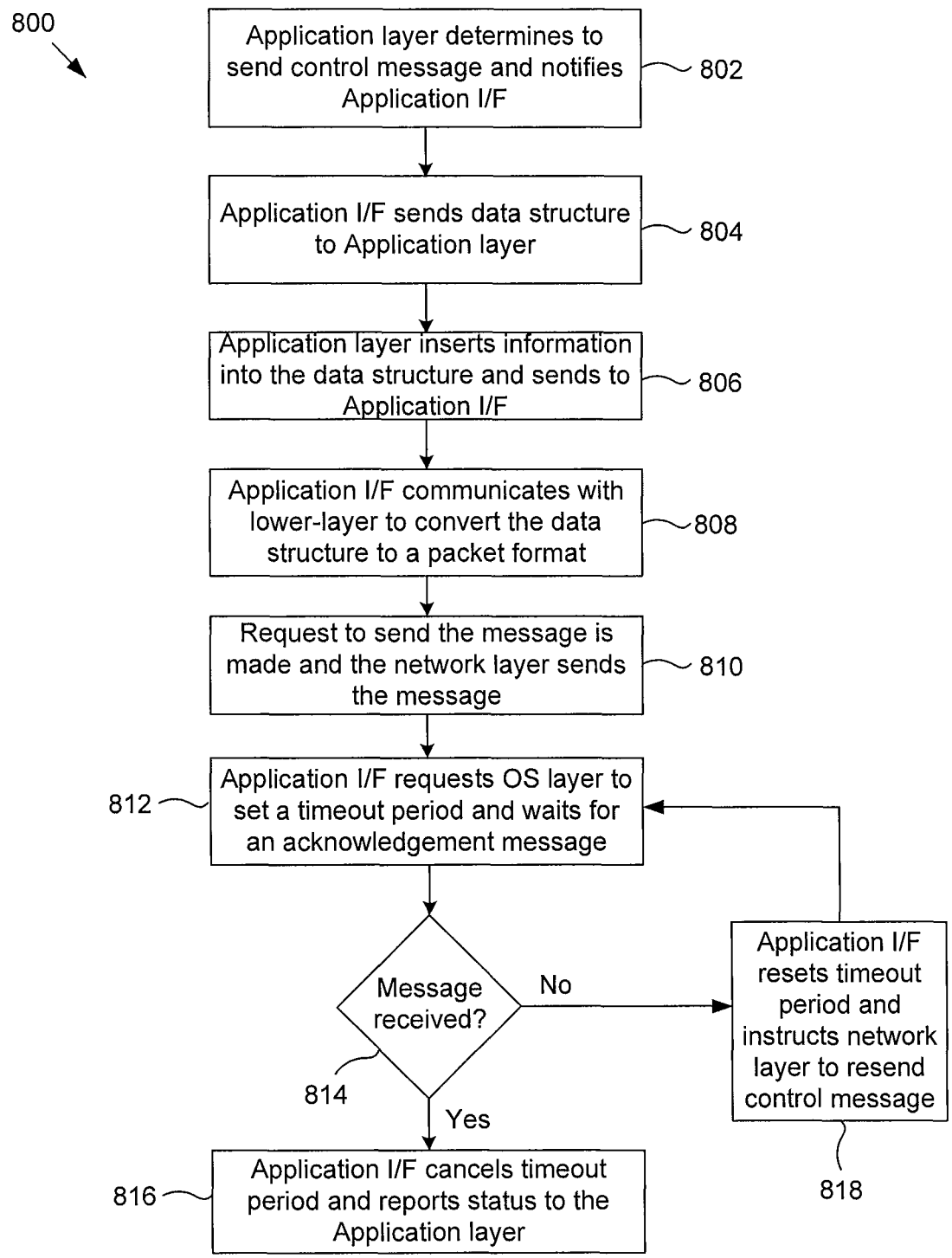
FIG. 8 is a flow diagram of an example method of transmitting a control message by an apparatus over an Ethernet Audio-Video Bridging (AVB) network.

FIG. 8 shows a flow diagram of an example method 800 of transmitting a control message by an apparatus over an Ethernet Audio-Video Bridging (AVB) network. At block 802, an application layer module of the apparatus may determine to send a control message over the Ethernet AVB network to control flow of a data stream. The application layer module may notify an application interface (I/F) module of the apparatus that it wants to send the control message. The notification may include a request for an empty or a partially empty data structure that the application layer module may use to generate the control message. In addition, the notification may include a request to allocate one or more data buffers to storage the control message and/or data parameters of the control. The notification may also include one or more size parameters that may indicate one or more sizes of the one or more buffers to be allocated.

At block 804, in response to the notification, the application interface module may send the empty or partially empty data structure to the application layer module. Alternatively, in addition, or as part of sending the data structure, the application interface module may allocate one or more data buffers having the one or more size parameters provided in the notification from the application layer.

At block 806, the application layer module may insert information included in the control message into the empty data structure received from the application interface module. The application layer module may then send the data structure with the information to the application layer interface.

At block 808, the application interface may communicate with a lower-layer module to convert the data message to a control message having a packet format that is suitable or configured for transmission over the network. As previously described, an example packet format may be a TLV format that includes a type field, a length field, and a value field. The type field may indicate that the data structure is the control message, the length field may provide a length of the control message data structure, and the value field may provide a sequence number and a data field that includes one or more data parameters used to control the flow of the data stream, as previously described. The conversion of the data structure to the control message may also comprise including the control message in a data packet. The data packet may be a UDP datagram as described above. The control message may be referred to as a control message telegram.

At block 810, the application interface module and/or the one or more modules included in the lower-layer module may determine to send the control message telegram to a network layer module and request and/or instruct the network layer module to send the data packet over the network. The instruction and/or the request to the network layer may follow a determination by the application interface module that it is unable send the data packet over the network without one or more services or functions performed by the network layer module. In some examples, the determination to send the control message telegram to the network layer module includes a determination that the network layer module is unable to send the control message telegram at the time that the request to send the control message telegram is made. Where the application layer interface module and/or the lower-layer module make the determination, the application interface module or a lower-layer module may hold the control message in a stack or a queue. While the control message is being held, the application layer module, the application interface module, and the lower layer module may communicate with each other to generate one or more additional control messages in the packet format. The one or more additional control messages may have a destination that is the same as the first control message. When the network layer module is ready to communicate the one or more control messages over the network, the lower layer module may include the one or more control messages in a data packet, such as the UDP datagram, and send the data packet to the network layer module, where the network layer module is sent over the network.

At block 812, after the data packet is sent over the network, the application interface module may request an operating system (OS) layer module of the lower-layer module to set a timeout period. The timeout period may establish a period that the application interface module waits for an acknowledgement message or a negative acknowledgement message before resending the data packet. The acknowledgement message may indicate that the data packet or one or more control messages in the data packet was received and the one or more control messages included in the data packet are able to be processed. The negative acknowledgement message may indicate that the data packet or one or more control messages in the data packet was received and the one or more control messages included in the data packet were not able to be processed. After the timer is set, the application interface module waits for the acknowledgement message or the negative acknowledgement message.

At block 814, if the acknowledgement message or the negative acknowledgement was received before the timeout period expired, then at block 816 the application interface module instructs the OS layer module to cancel the timeout period and notifies the application layer module that the control message was received. The application interface module may also inform the application layer module of the status of the one or more control messages, which may correspond to whether the acknowledgement message indicating successful reception or the negative message indicating unsuccessful reception of the control message is received. Referring back to block 814, if the timeout period has expired and the acknowledgement message or the negative acknowledgement message is not received, then at block 818, the application interface module may instruct the network layer module to resend the data packet. The application interface module may also request that the OS layer module restart the timeout period and may wait for the acknowledgement message or the negative acknowledgement message at block 812.

Figure 9:
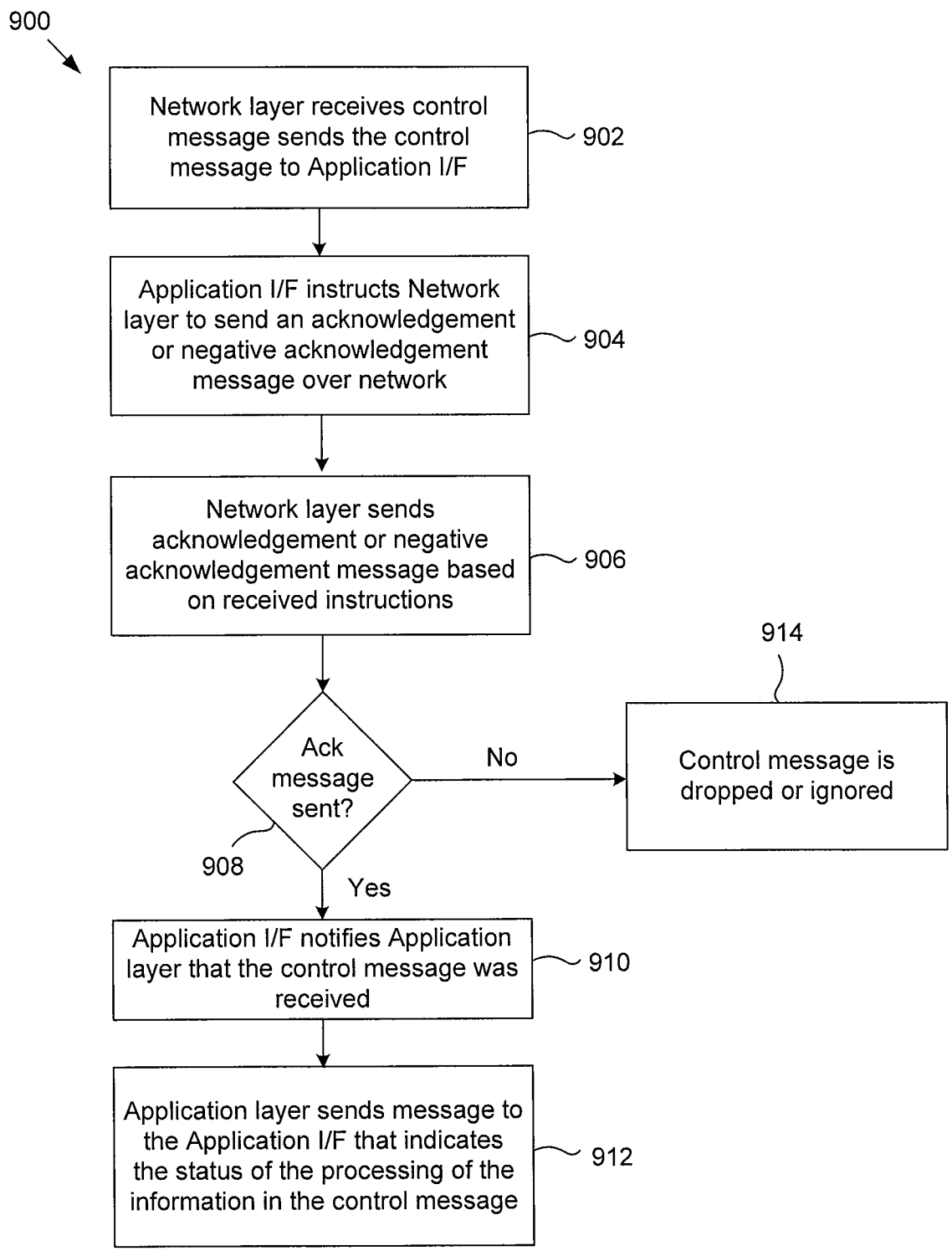
FIG. 9 is a flow diagram of an example method of receiving a control message by an apparatus of the Ethernet AVB network.

FIG. 9 shows a flow diagram of an example method 900 of receiving a control message by an apparatus over an Ethernet Audio-Video Bridging (AVB) network. At block 902, a network layer module of the apparatus may receive the control message, or a data packet carrying the control message, and notify an application interface module that the control message was received. At block 904, the application interface module may instruct the network layer module to send an acknowledgement message or a negative acknowledgement message over the network. The application interface module may instruct the network layer module to send the acknowledgement or the negative acknowledgement message based on a determination of whether an application layer module is able to handle and/or process the control message. At block 906, the network layer module sends the acknowledgement or negative acknowledgment message based on the instructions received from the application interface module.

At block 908, if the network layer module sent the acknowledgement message, then the method proceeds to block 910. At block 910, the application interface module notifies the application layer module that the control message was received. The application interface module may include the control message as part of the notification. If multiple control messages were included in the data packet, then the application interface module may first separate the data packet into the individual control messages, and then provide individual notifications to the application layer of the individual control messages. At block 912, in response to the notification, the application layer module may be configured to provide the application interface module a status of the processing of the control message. The status may include an indication that the application layer module is finished processing the control message. Alternatively, the status may include an indication that the application layer module needs more time to finish processing the control message. If the status indicated that more time is needed, then the application layer module may send a second status message to the application interface module when the application layer module is finished processing the control message and indicating that the control message is finished processing the control message. In response to receipt of a message that the application layer module is finished processing the control message, the application interface may reclaim the memory used to transmit the control message to the application layer module.

Referring back to block 908, if the acknowledgement message is not sent and instead, the negative acknowledgement message is sent, then the method proceeds to block 914, where the control message is discarded, dropped and/or ignored due to insufficient capacity to process and/or handle the control message.

Figure 10:
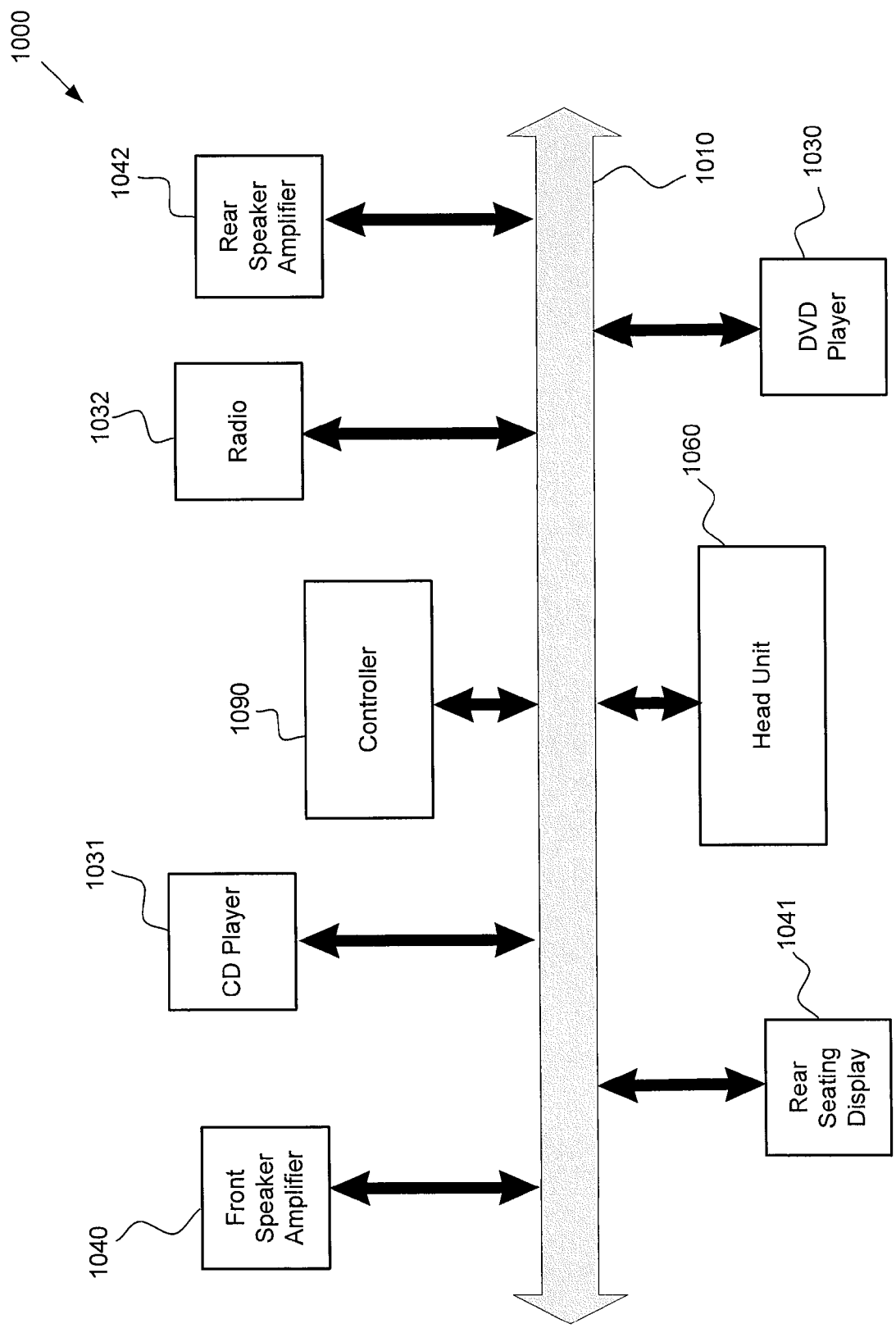
FIG. 10 is a block diagram of an example network communication system.

FIG. 10 shows an example system 1000 that includes a controller 1090, a client 1060, one or more talkers 1030, 1031, 1032, and one or more listeners 1040, 1041, 1042. The example system 1000 may comprise an automobile communication system. The talkers of the automobile communication system 1000 may include a DVD player 1030, a CD player 1031, and/or a radio 1032. The listeners of the automobile communication system 1000 may include a front speaker amplifier 1040, a rear seating display 1041, and a rear amplifier 1042. The client of the automobile communication system may be a head unit 1060. The head unit may include various controls such as volume controls, channel controls, DVD player and/or CD player controls such as play, stop, fast forward, rewind, and pause. Other controls may be included in the head unit. The controls may be operated by a user of the communication system 1000, such as a driver or a passenger of the automobile. The user may operate the head unit 1060 to control the talkers 1030, 1031, 1032 and/or the listeners 1040, 1041, 1042. For example, if a user wants to lower the volume of music in the automobile, the user may operate a volume knob on the head unit 1060, which may control the front speaker amplifier 1040 and/or the rear speaker amplifier 1042.

The talkers 1030, 1031, 1032, the listeners 1040, 1041, 1042, the head unit 1060, and the controller 1090 may be in communication with one or more of each other by communicating over the network 1010. The network 1010 may be an Ethernet AVB network. Data streams transmitted from the talkers to the listeners may be sent over one or more Ethernet cables comprising the Ethernet AVB network. To reserve and/or remove a reservation for a stream between the talkers and the listeners, the network may use the Stream Reservation Protocol (SRP) as described in IEEE 802.1Qat-2010. The SRP may be used by communicating through a SRP stack that is included in or accessible by the components 1030, 1031, 1032, 1040, 1041, 1042, 1060 or 1090 of the system. The control signals for controlling the data streams may also be sent over the Ethernet cables. In addition, the control signals may be initiated, generated, received, and/or processed at one or more high-level application layer modules of the components of the system 1000. The control signals may be communicated over the Ethernet AVB network to and from the application layer through application interface module. Each of the DVD player 1030, CD player 1031, radio 1032, front speaker amplifier 1040, rear seating display 1041, rear speaker amplifier 1042, head unit 1060, and controller have an application module, an application interface module, and a lower-layer module. In one example, the application modules comprise FBlock modules and the application interface modules comprise FBlock interface modules. Where the components of the system 1000 have FBlock interface modules, the control signals sent over the network 1010 may comprise FBlock control signals. The controller 1090 may be configured to send and/or receive control signals, such as FBlock control signals, to each of the components 1030, 1031, 1032, 1040, 1041, 1042, and 1060 of the system 1000. The controller 1090 may be or may include an application layer interface to send and/or receive the control signals.

An exemplary operation of the system 1000 may include a driver of the automobile that wishes to start a DVD for a passenger in a rear seat of the automobile. To start the DVD, the driver may press a "Play" button that is in communication with the head unit 1060. The application layer module of the head unit 1060, recognizing that the "Play" button was pressed, may communicate the application interface module and the network layer module as previously described to generate and send a "Play" command message in a data packet, such as a UDP datagram to the controller 1090. The "Play" command message may instruct the controller to create an A/V stream between the DVD player 1030 and the rear seating display 1041. The application interface of the head unit 1060 may also instruct an OS layer module to set a timeout period. The application interface module of the controller 1090 may receive the "Play" command message from the head unit 1060 through a network layer module of the lower-layer module of the controller 1090. Upon receiving the "Play" control message, the application interface module may instruct the network layer module to send an acknowledgement message or a negative acknowledgement message over the network 1010 to the head unit 1060.

In addition, the controller 1090 may also be configured to send its own "Play" control message to the DVD player 1030, instructing the DVD player 1030 to create a data stream. The application layer module of the controller 1090 may generate and send the "Play" control message using the application interface module and the lower-layer module, as previously described. Upon receipt of the "Play" control message from the controller 1090, the application interface of the DVD player 1030, or a talker operable with the DVD player 1030, may send an acknowledgement or a negative acknowledgement message back to the controller 1090. In addition, the application layer module of the DVD player 1030 may process the "Play" control message and create the connection of the data stream. After processing the "Play" control message, the application layer module of the DVD player 1030 may generate and send a "Success" control message to the controller 1090 using the application layer interface module and the lower-layer module 1090. The Success control message may include a stream ID identifying the stream that the DVD player 1030 wants to create.

The application interface module of the controller 1090 may receive the "Success" control message from the DVD player 1030 and instruct the network layer module to send an acknowledgement message or a negative acknowledgement message back to the DVD player 1030. In addition, in response to receiving the "Success" control message, the application layer module of the controller 1090 may process the "Success" control message and determine to send a "Connect" control message to the rear seating display 1041. The controller 1090 may generate and send the "Connect" control message using the application interface module and the lower-level layer modules. Upon receipt of the "Connect" control message, the application interface module of the rear seating display 1041 may instruct the network layer module to send an acknowledgement message or a negative acknowledgement message to the controller 1090. The application layer module of the rear seating display 1041 may be configured to process the "Connect" control message to connect to the data stream that the DVD player 1030 established. After connecting to the data stream, the application layer module of the rear seating display 1041 may generate and send a "Success" control message to the controller 1090. In response to receipt of the "Success" control message, the application interface of the controller 1090 may send an acknowledgement message or a negative acknowledgement message back to the rear seating display 1041. In addition, the application layer module of the controller 1090 may be configured to process the "Success" control message. After processing the "Success" control message, the application layer module of the controller 1090 may be configured to generate its own "Success" control message and send the "Success" control message to the head unit 1060, informing the head unit that the data stream has been created. The application interface module of the head unit 1060 may be configured to instruct the network layer module to send an acknowledgement message or a negative acknowledgement message to the controller 1090.

The above operation is merely exemplary and other operations may be performed on the system 1000 or other systems involving clients, controllers, talkers, listeners, and/or talkers/listeners in an Ethernet AVB environment in accordance with the above descriptions.

Figure 11:
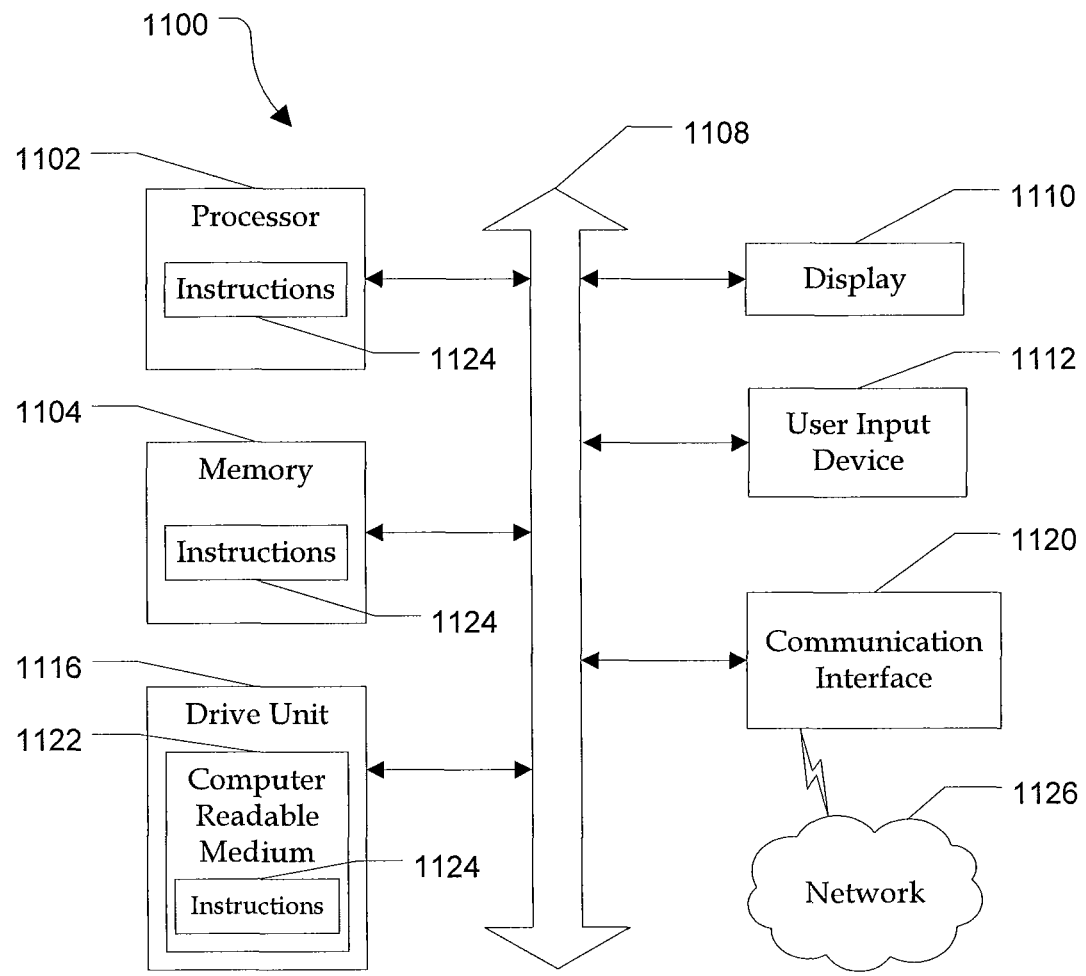
FIG. 11 is an example of a processing system for use with one or more components in the network communication system.

One or more of the talkers, such as talker 130, 131, and 132, listeners 140, 141, and 142, talker/listeners 150, and/or controllers 190 shown in FIG. 1, and/or one or more transmitting apparatuses 220 and/or one or more receiving apparatuses 230 may be and/or may include a portion or all of one or more computing devices of various kinds, such as the computing device in FIG. 11. FIG. 11 illustrates an example of a general computer system designated 1100. Any of the components from the system 100 and/or the system 200 may include a portion or all of the computer system 1100. For example, in some examples, the computer system 1100 may include only a processor and memory. The computer system 1100 can include a set of instructions that can be executed to cause the computer system 1100 to perform any one or more of the methods or computer based functions disclosed. The computer system 1100 may operate as a standalone device or may be connected, e.g., using a network, to other computer systems or peripheral devices.

In a networked deployment, the computer system 1100 may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 1100 can be implemented using electronic devices that provide voice, audio, video or data communication. Further, while a single computer system 1100 is illustrated, the term "system" shall also be taken to include any collection of systems or sub-systems that individually or jointly execute a set, or multiple sets, of instructions to perform one or more computer functions.

In FIG. 11, the example computer system 1100 may include a processor 1102, e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The term "module" may be defined to include a plurality of executable modules. As described herein, the modules are defined to include software, hardware or some combination thereof executable by a processor, such as processor 1102. Software modules may include instructions stored in memory, such as memory 1104, or another memory device, that are executable by the processor 1102 or other processor. Hardware modules may include various devices, components, circuits, gates, circuit boards, and the like that are executable, directed, and/or controlled for performance by the processor 1102.

The computer system 1100 may include a memory 1104, such as a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1104 includes a cache or random access memory for the processor 1102. In alternative examples, the memory 1104 is separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described may be performed by the programmed processor 1102 executing the instructions stored in the memory 1104. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1100 may or may not further include a display unit 1110, such as a liquid crystal display (LCD), an organic light emitting diode (OLED), a flat panel display, a solid state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive unit 1116.

Additionally, the computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the computer system 1100.

In a particular example, as depicted in FIG. 11, the computer system 1100 may also include a disk or optical drive unit 1116. The disk drive unit 1116 may include a computer-readable medium 1122 in which one or more sets of instructions 1124, e.g. software, can be embedded. Further, the instructions 1124 may embody one or more of the methods or logic as described. In a particular example, the instructions 1124 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium that includes instructions 1124 or receives and executes instructions 1124 responsive to a propagated signal so that a device connected to a network 1126 can communicate voice, video, audio, images or any other data over the network 1126. Further, the instructions 1124 may be transmitted or received over the network 1126 via a communication port or interface 1120, and/or using a bus 1108. The communication port or interface 1120 may be a part of the processor 1102 or may be a separate component. The communication port 1120 may be created in software or may be a physical connection in hardware. The communication port 1120 may be configured to connect with a network 1126, external media, the display 1110, or any other components in system 1100, or combinations thereof. The connection with the network 1126 may be a physical connection, such as a wired Ethernet connection or may be established wirelessly as discussed later. Likewise, the additional connections with other components of the system 1100 may be physical connections or may be established wirelessly. The network 1126 may alternatively be directly connected to the bus 1108.

The network 1126 may include wired networks, wireless networks, Ethernet AVB networks, or combinations thereof. The wireless network may be a cellular telephone network, an 802.11, 802.16, 802.20, 802.1Q or WiMax network. Further, the network 1126 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of transmitting a control message by an apparatus over a first network having a first transport mechanism, the control message controlling flow of a data stream over the first network, the method comprising:
   notifying, with an application layer module of the apparatus, an application interface module of the apparatus that the application layer module wants to transmit the control message, the application layer module being configured to provide information of the control message for a second network having a second transport mechanism;
   providing, with the application interface module, a data structure to the application layer module;
   inserting, with the application layer module, information of the control message for the second network having the second transport mechanism into the data structure;

sending, with the application layer module, the data structure to the application interface module to transmit the control message over the first network; and communicating, with the application interface module, the information of the control message for the second network in the data structure to a lower-layer module of the apparatus to generate the control message in a packet format that is suitable for transmission over the first network;

where the first transport mechanism comprises prioritized packet switching and the second transport mechanism comprises time division multiplexing, and where the first network comprises an Ethernet Audio/Video Bridging (AVB) network and the second network comprises a Media Oriented Systems Transport (MOST) network.

2. The method of claim 1, further comprising:
instructing a network layer module of the apparatus to send the control message over the first network.

3. The method of claim 1, further comprising:
sending, with a network layer module of the apparatus, the control message over the first network in a User Datagram Protocol ("UDP") datagram.

4. The method of claim 1, where a format of the control message comprises a type-length-value ("TLV") format, the TLV format comprising:
a type field that comprises a type indicator indicating that the data structure is the control message,
a length field that comprises a length indicator indicating a length of the control message, and
a value field that comprises a sequence number indicator that indicates a sequence number that uniquely identifies the control message.

5. The method of claim 4, where the value field further comprises:
an address field that identifies a receiving apparatus to which to send the control message; and
a function field that identifies one or more functions that the receiving apparatus is to perform.

6. The method of claim 1, where the control message comprises a first control message, further comprising:
generating, with the application layer module, a second control message; and
sending, with a network layer module of the apparatus, the first control message and the second control message over the first network in a User Datagram Protocol ("UDP") datagram.

7. The method of claim 1, further comprising:
instructing, with the application interface module, an operating system layer of the apparatus to establish a timeout period for the application interface module to wait before resending the control message.

8. The method of claim 7, further comprising:
receiving, with a network layer module, a received message from the first network, the received message comprising one of an acknowledgement message and a negative acknowledgement message;
where the acknowledgement message indicates that the control message was received and is able to be processed; and
where the negative acknowledgement message indicates that the control message was received and is not able to be processed.

9. The method of claim 8, where each of the acknowledgement message and the negative acknowledgement message comprises a sequence number that correlates with a sequence number of the control message.

10. The method of claim 8, further comprising:
instructing, with the application interface module, the operating system layer to remove the timeout period in response to receipt of the received message.

11. An apparatus that is configured to transmit a control message that controls flow of a data stream over a first network having a first transport mechanism, the apparatus comprising:
a memory comprising a non-transitory computer readable medium storing instructions executable by a processor;
an application layer module that is configured to provide information of the control message for a second network having a second transport mechanism; and
an application interface module in communication with the application layer module;
where the application layer module is configured to notify the application interface module the application layer wants to transmit the control message;
where the application interface module is configured to provide a data structure to the application layer module in response to the notification;
where the application layer module is further configured to:
insert the information of the control message or the second network having the second transport mechanism into the data structure, and
instruct the application interface module to transmit the control message over the first network; and
where the application interface module is configured to communicate with a lower-layer module to convert the data structure to a packet format that is suitable for transmission over the first network; and
where the first transport mechanism comprises prioritized packet switching and the second transport mechanism comprises time division multiplexing, and where the first network comprises an Ethernet Audio/Video Bridging (AVB) network and the second network comprises a Media Oriented Systems Transport (MOST) network.

12. The apparatus of claim 11, where the lower-layer module comprises a network layer module, the network layer module being configured to send the control message over the first network.

13. The apparatus of claim 12, where the network layer module is configured to send the control message over the first network in a User Datagram Protocol ("UDP") datagram.

14. The apparatus of claim 11, where the packet format of the control message comprises a type-length-value ("TLV") format, the TLV format comprising:
a type field that comprises a type indicator indicating that the data structure is the control message,
a length field that comprises a length indicator indicating a length of the control message, and
a value field that comprises a sequence number indicator that indicates a sequence number that uniquely identifies the control message.

15. The apparatus of claim 14, where the value field further comprises:
an address field that identifies a receiving apparatus to which to send the control message; and
a function field that identifies one or more functions that the receiving apparatus is to perform.

16. The apparatus of claim 13, where the control message comprises a first control message,
where the application layer module is further configured to generate a second control message; and where the network layer module is further configured to send the second control message over the first network in the User Datagram Protocol ("UDP") datagram.

17. The apparatus of claim 12, further comprising an operating system layer module in communication with the application interface module,
where the application interface module is further configured to instruct the operating system layer module to establish a timeout period for the application interface module to wait before resending the control message.

18. The apparatus of claim 17, where the network layer module is configured to receive a received message from the first network, the received message comprising one of an acknowledgement message and a negative acknowledgement message;
where the acknowledgement message indicates that the control message was received and is able to be processed; and
where the negative acknowledgement message indicates that the control message was received and is not able to be processed.

19. The apparatus of claim 18, where each of the acknowledgement message and the negative acknowledgement message comprises a sequence number that correlates with a sequence number of the control message.

20. The apparatus of claim 18, where the application interface module is further configured to instruct the operating system layer module to remove the timeout period in response to receipt of the received message.

21. The apparatus of claim 11, where the application layer module is further configured to generate a synchronization message to synchronize a coordination of sequence numbers between the apparatus and a receiving apparatus receiving the control message.

22. An apparatus that is configured to receive a control message that controls flow of a data stream over a first network having a first transport mechanism, the apparatus comprising:
a memory comprising a non-transitory computer readable medium storing instructions executable by a processor;
an application layer module that is configured to process a control message that is generated for a second network having a second transport mechanism;
an application interface module in communication with the application layer module; and
a network layer module in communication with the application interface module, where the network layer module is configured to:
receive the control message from the first network; and
notify the application interface module that the control message is received;
where the application interface module is configured to:
in response to the notification, instruct the network layer module to send a received message over the first network, the received message indicating that the control message is received and whether the application layer module is able to process the control message; and
where the first transport mechanism comprises prioritized packet switching and the second transport mechanism comprises time division multiplexing, and where the first network comprises an Ethernet Audio/Video Bridging (AVB) network and the second network comprises a Media Oriented Systems Transport (MOST) network.

23. The apparatus of claim 19, where the received message comprises a sequence number that correlates to a sequence number of the control message.

24. The apparatus of claim 22, where the application interface module is further configured to:
notify the application layer module that the control message is received; and
provide at least some information in the control message to the application layer module.

25. The apparatus of claim 24, where the application layer module is configured to provide the application layer module with a status of whether the application module is finished processing the at least some information in the control message.

26. The apparatus of claim 22, where the control message comprises a first control message,
where the network layer module is further configured to receive the first control message and a second control message in a User Datagram Protocol ("UDP") datagram,
where the application interface module is configured to:
divide the UDP datagram into the first control message and the second control message, and
provide the first control message and the second control message to the application layer module.

27. A network communication system comprising:
a transmitting apparatus that is configured to transmit a control message that controls flow of a data stream over a first network having a first transport mechanism, the apparatus comprising:
a memory comprising a non-transitory computer readable medium storing instructions executable by a processor;
an application layer module that is configured to provide information of the control message for a second network having a second transport mechanism; and
an application interface module in communication with the application layer module;
where the application layer module is configured to:
insert the information of the control message for the second network having the second transport mechanism into a data structure, and
instruct the application interface module to transmit the control message over the first network; and
where the application interface module is configured to:
communicate with a lower-layer module to generate the control message having a packet format that is suitable for transmission over the first network; and
notify the application layer module that the control message was received; and
a receiving apparatus that is configured to receive the control message over the first network, the receiving apparatus comprising:
a memory comprising a non-transitory computer readable medium storing instructions executable by a processor;
an application layer module that is configured to process the control message in the second network; and
an application interface module in communication with the application layer module,
where the application interface module is configured to:
provide at least some information in the control message to the application layer module; and
provide instructions to send an acknowledgement message over the first network that indicates that the control message was received; and
where the first transport mechanism comprises prioritized packet switching and the second transport mechanism comprises time division multiplexing, and where the first network comprises an Ethernet Audio/Video Bridging (AVB) network and the second network comprises a Media Oriented Systems Transport (MOST) network.

28. A computer program product having a non-transitory computer readable medium tangibly embodying computer executable code for operating an apparatus to transmit a control message over a first network having a first transport mechanism, the product comprising:
  code to notify, with an application layer module of the apparatus, an application interface module of the apparatus that the application layer module wants to transmit the control message, the application layer module being configured to provide information of the control message for a second network having a second transport mechanism;
  code to provide, with the application interface module, a data structure to the application layer module;
  code to insert, with the application layer module, the information of the control message for the second network having the second transport mechanism into the data structure; and
  code to communicate, with the application interface module, the information of the control message for the second network having the second transport mechanism to a lower-layer module to generate the control message in a packet format that is suitable for transmission over the first network;
  where the first transport mechanism comprises prioritized packet switching and the second transport mechanism comprises time division multiplexing, and where the first network comprises an Ethernet Audio/Video Bridging (AVB) network and the second network comprises a Media Oriented Systems Transport (MOST) network.

29. The product of claim 28, further comprising:
  code to send, with a network layer module of the apparatus, the control message over the first network.

30. The product of claim 28, where code to generate the control message comprises code to generate the control message having a type-length-value ("TLV") format, the TLV format comprising:
  a type field that comprises a type indicator indicating that the data structure is the control message,
  a length field that comprises a length indicator indicating a length of the control message, and
  a value field that comprises a sequence number indicator that indicates a sequence number that uniquely identifies the control message.

31. The product of claim 30, further comprising:
  code to instruct, with the application interface module, an operating system layer module of the apparatus to establish a timeout period for the application interface module to wait before resending the control message.

* * * * *